(12) United States Patent
Koh et al.

(10) Patent No.: US 12,558,783 B2
(45) Date of Patent: Feb. 24, 2026

(54) ROBOT USING MOVING WALK AND METHOD OF CONTROLLING THE SAME

(71) Applicant: SAMSUNG ELECTRONICS CO., LTD., Suwon-si (KR)

(72) Inventors: Youngil Koh, Suwon-si (KR); Hyunki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 18/529,774

(22) Filed: Dec. 5, 2023

(65) Prior Publication Data

US 2024/0109192 A1 Apr. 4, 2024

Related U.S. Application Data

(63) Continuation of application No. PCT/KR2023/012666, filed on Aug. 25, 2023.

(30) Foreign Application Priority Data

Aug. 26, 2022 (KR) ........................ 10-2022-0107763

(51) Int. Cl.
        *B25J 9/16*          (2006.01)
        *B25J 5/00*          (2006.01)
        *B25J 9/00*          (2006.01)
(52) U.S. Cl.
        CPC ............. *B25J 9/1653* (2013.01); *B25J 5/007* (2013.01); *B25J 9/0093* (2013.01); *B25J 9/1674* (2013.01);
                    (Continued)
(58) Field of Classification Search
        CPC ........ B25J 9/1653; B25J 5/007; B25J 9/0093; B25J 9/1674; B25J 9/1697; B25J 9/0006;
                    (Continued)

(56) References Cited

U.S. PATENT DOCUMENTS

| | | |
|---|---|---|
| 11,238,594 B2 | 2/2022 | Raag |
| 11,269,328 B2 | 3/2022 | Kim et al. |

(Continued)

FOREIGN PATENT DOCUMENTS

| | | |
|---|---|---|
| CN | 111891252 B | 11/2021 |
| JP | 2022-511978 A | 2/2022 |

(Continued)

OTHER PUBLICATIONS

Communication issued Jun. 2, 2025 by the European Patent Office in European patent Application No. 23857788.6.

(Continued)

*Primary Examiner* — Adam R Mott
*Assistant Examiner* — Sagar Kc
(74) *Attorney, Agent, or Firm* — Sughrue Mion, PLLC

(57) ABSTRACT

A robot, includes: a camera: a driver comprising a plurality of wheels and a suspension for connecting each of the plurality of wheels to a body of the robot; and a processor. The processor is configured to: identify both a movement direction of a moving walkway and a movement speed of the moving walkway based on a plurality of images of the moving walkway received from the camera after the processor identifies that the robot is located in an entrance area of the moving walkway, control the driver so that the robot faces an entering direction corresponding to the identified movement direction; control the suspension connected to at least one of the plurality of wheels so that the robot is tilted at an angle corresponding to the identified movement speed, and control the driver so that the tilted robot moves in the entering direction and enters the moving walkway.

20 Claims, 15 Drawing Sheets

(52) U.S. Cl.
CPC ............ *B25J 9/1697* (2013.01); *B25J 9/0006*
(2013.01); *B25J 9/161* (2013.01)

(58) Field of Classification Search
CPC ..... B25J 9/161; B25J 11/008; G05D 2107/60;
G05D 2109/10; G05D 2111/10; G05D
1/243; G05D 1/435; G05D 1/495; G05D
1/65; B60G 17/016; B60G 2400/051;
B60G 2800/01; G06T 7/246
See application file for complete search history.

(56) References Cited

U.S. PATENT DOCUMENTS

| | | | |
|---|---|---|---|
| 11,314,263 B2 | 4/2022 | Moon et al. | |
| 11,529,736 B2 | 12/2022 | Badiozamani et al. | |
| 11,537,137 B2 | 12/2022 | Park | |
| 2019/0369622 A1* | 12/2019 | Kim | G05D 1/0088 |
| 2021/0078180 A1* | 3/2021 | Kim | B25J 13/081 |
| 2021/0299873 A1 | 9/2021 | Badiozamani et al. | |
| 2021/0382494 A1 | 12/2021 | Park | |
| 2022/0118613 A1 | 4/2022 | Shin et al. | |

FOREIGN PATENT DOCUMENTS

| | | |
|---|---|---|
| KR | 10-1694855 B1 | 1/2017 |
| KR | 10-2019-0086628 A | 7/2019 |
| KR | 10-2019-0095196 A | 8/2019 |
| KR | 10-2012548 B1 | 8/2019 |
| KR | 10-2021-0058980 A | 5/2021 |
| WO | 2022/157294 A1 | 7/2022 |

OTHER PUBLICATIONS

Ni, Liwei et al., "Posture Control of a Four-Wheel-Legged Robot
With a Suspension System", IEEE Access, Aug. 18, 2020, vol. 8, pp.
152790-152804, XP093277893. (15 pages total).
International Search Report (PCT/ISA/210) issued on Dec. 8, 2023
by the International Searching Authority for International Patent
Application No. PCT/KR2023/012666.
Written Opinion (PCT/ISA/237) issued on Dec. 8, 2023 by the
International Searching Authority for International Patent Applica-
tion No. PCT/KR2023/012666.

* cited by examiner

FIG. 14

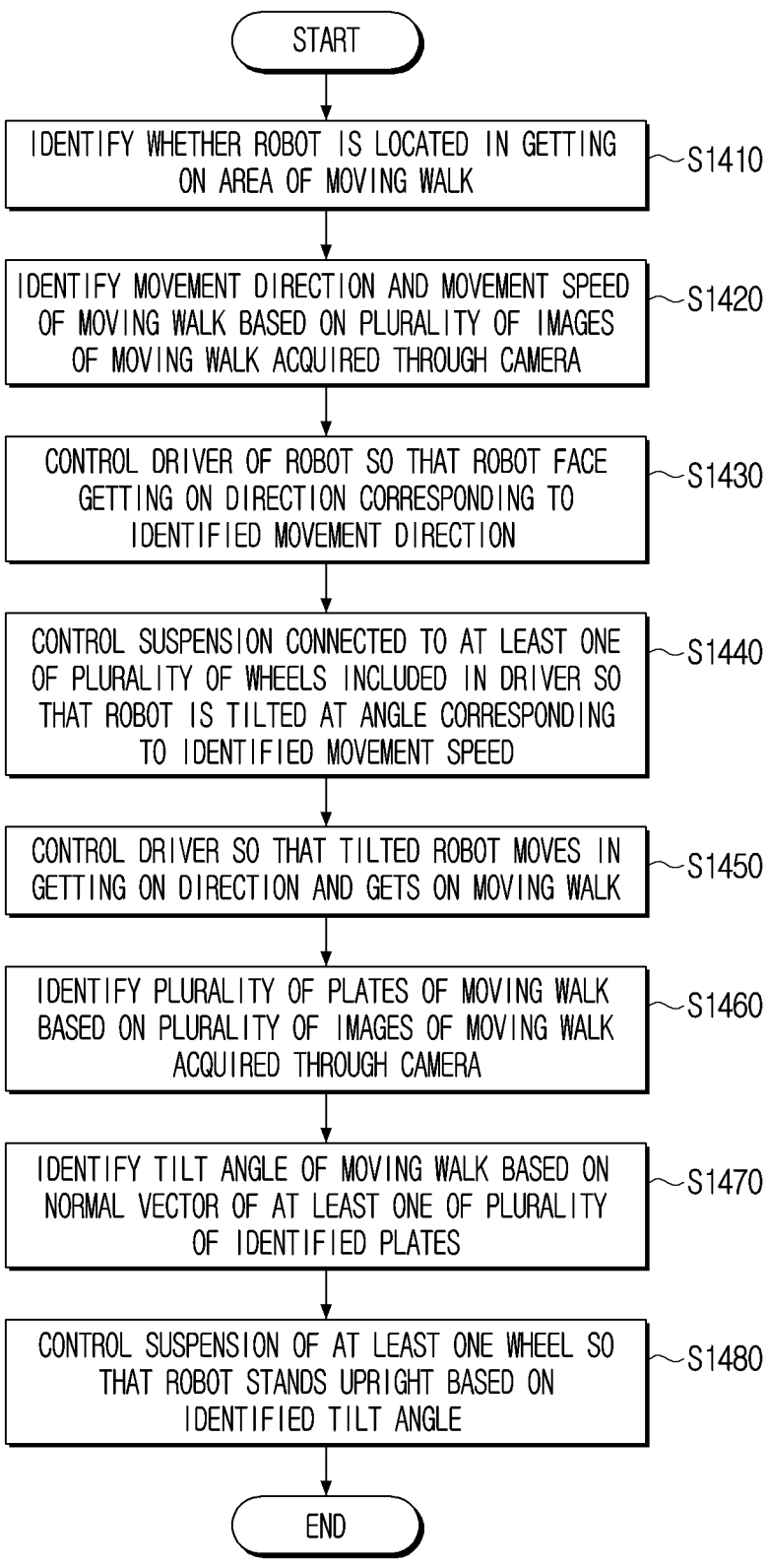

START

IDENTIFY WHETHER ROBOT IS LOCATED IN GETTING ON AREA OF MOVING WALK ~S1410

IDENTIFY MOVEMENT DIRECTION AND MOVEMENT SPEED OF MOVING WALK BASED ON PLURALITY OF IMAGES OF MOVING WALK ACQUIRED THROUGH CAMERA ~S1420

CONTROL DRIVER OF ROBOT SO THAT ROBOT FACE GETTING ON DIRECTION CORRESPONDING TO IDENTIFIED MOVEMENT DIRECTION ~S1430

CONTROL SUSPENSION CONNECTED TO AT LEAST ONE OF PLURALITY OF WHEELS INCLUDED IN DRIVER SO THAT ROBOT IS TILTED AT ANGLE CORRESPONDING TO IDENTIFIED MOVEMENT SPEED ~S1440

CONTROL DRIVER SO THAT TILTED ROBOT MOVES IN GETTING ON DIRECTION AND GETS ON MOVING WALK ~S1450

IDENTIFY PLURALITY OF PLATES OF MOVING WALK BASED ON PLURALITY OF IMAGES OF MOVING WALK ACQUIRED THROUGH CAMERA ~S1460

IDENTIFY TILT ANGLE OF MOVING WALK BASED ON NORMAL VECTOR OF AT LEAST ONE OF PLURALITY OF IDENTIFIED PLATES ~S1470

CONTROL SUSPENSION OF AT LEAST ONE WHEEL SO THAT ROBOT STANDS UPRIGHT BASED ON IDENTIFIED TILT ANGLE ~S1480

END

FIG. 15

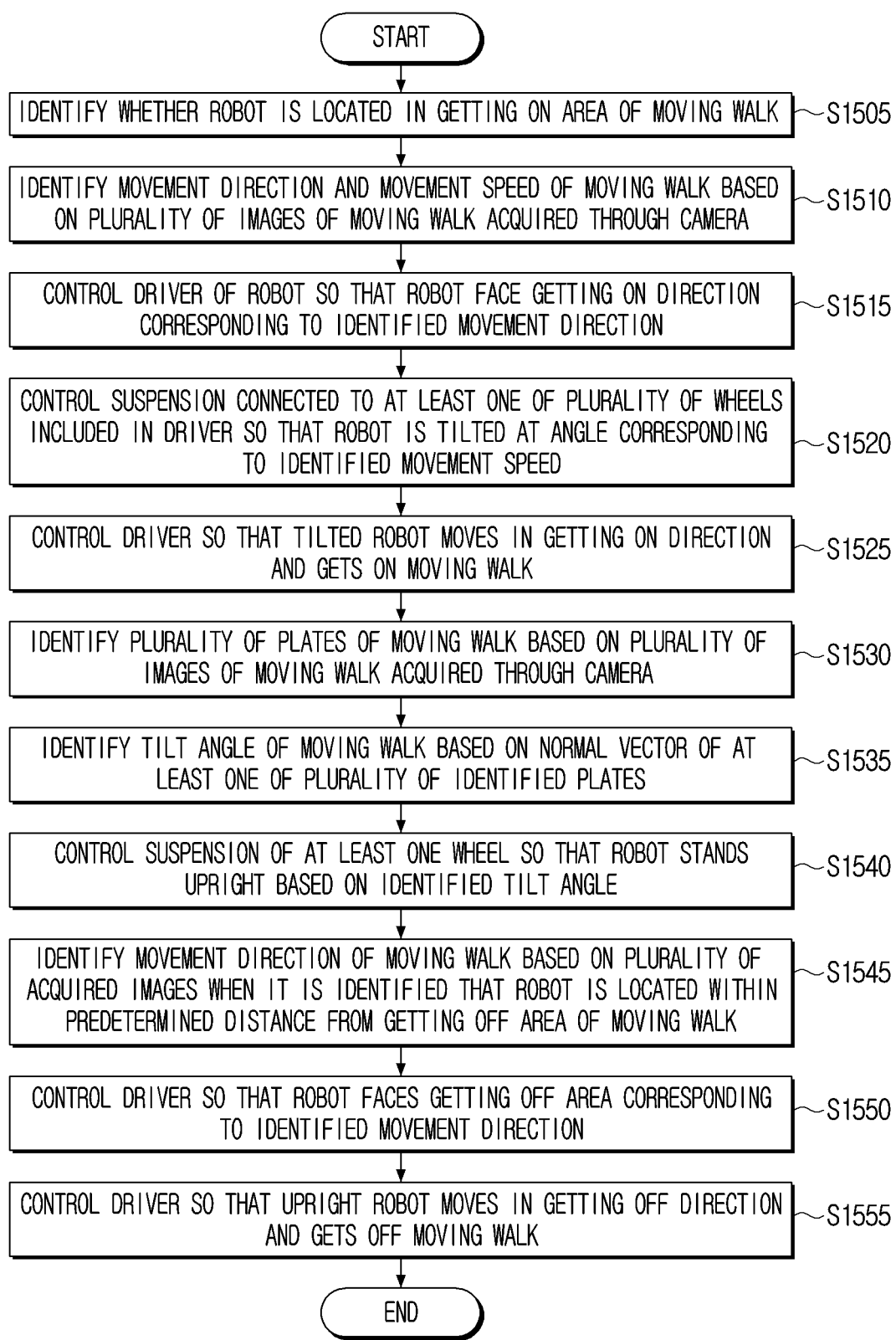

START

IDENTIFY WHETHER ROBOT IS LOCATED IN GETTING ON AREA OF MOVING WALK —S1505

IDENTIFY MOVEMENT DIRECTION AND MOVEMENT SPEED OF MOVING WALK BASED ON PLURALITY OF IMAGES OF MOVING WALK ACQUIRED THROUGH CAMERA —S1510

CONTROL DRIVER OF ROBOT SO THAT ROBOT FACE GETTING ON DIRECTION CORRESPONDING TO IDENTIFIED MOVEMENT DIRECTION —S1515

CONTROL SUSPENSION CONNECTED TO AT LEAST ONE OF PLURALITY OF WHEELS INCLUDED IN DRIVER SO THAT ROBOT IS TILTED AT ANGLE CORRESPONDING TO IDENTIFIED MOVEMENT SPEED —S1520

CONTROL DRIVER SO THAT TILTED ROBOT MOVES IN GETTING ON DIRECTION AND GETS ON MOVING WALK —S1525

IDENTIFY PLURALITY OF PLATES OF MOVING WALK BASED ON PLURALITY OF IMAGES OF MOVING WALK ACQUIRED THROUGH CAMERA —S1530

IDENTIFY TILT ANGLE OF MOVING WALK BASED ON NORMAL VECTOR OF AT LEAST ONE OF PLURALITY OF IDENTIFIED PLATES —S1535

CONTROL SUSPENSION OF AT LEAST ONE WHEEL SO THAT ROBOT STANDS UPRIGHT BASED ON IDENTIFIED TILT ANGLE —S1540

IDENTIFY MOVEMENT DIRECTION OF MOVING WALK BASED ON PLURALITY OF ACQUIRED IMAGES WHEN IT IS IDENTIFIED THAT ROBOT IS LOCATED WITHIN PREDETERMINED DISTANCE FROM GETTING OFF AREA OF MOVING WALK —S1545

CONTROL DRIVER SO THAT ROBOT FACES GETTING OFF AREA CORRESPONDING TO IDENTIFIED MOVEMENT DIRECTION —S1550

CONTROL DRIVER SO THAT UPRIGHT ROBOT MOVES IN GETTING OFF DIRECTION AND GETS OFF MOVING WALK —S1555

END

ROBOT USING MOVING WALK AND METHOD OF CONTROLLING THE SAME

CROSS-REFERENCE TO RELATED APPLICATIONS

This application is a continuation application, claiming priority under § 365(c), of an International application No. PCT/KR2023/012666, filed on Aug. 25, 2023, which claims priority under 35 U. S. C. § 119 to Korean Patent Application No. 10-2022-0107763, filed on Aug. 26, 2022, the disclosures of which are incorporated herein by reference in their entireties.

TECHNICAL FIELD

Apparatuses and methods consistent with the disclosure relate to a robot and a method of controlling the same. More specifically, the disclosure relates to a robot using a moving walkway and a method of controlling the same.

BACKGROUND

Recently, with the development of electronic technology, robots are being used in various industrial fields. With the development of object recognition technology, robots may accurately distinguish various objects, and with the development of autonomous driving technology, robots may drive safely without interfering with human traffic in the driving space. It can be seen that robots such as serving robots serving food ordered by users in restaurants and guide robots guiding users on the way in airports, large marts, or other locations are used in various fields and ways.

As robots are used in various fields, a type and size of a space in which the robots drive have also diversified. In the past, robots could only travel in narrow and confined spaces, but can now travel in wider and more open spaces. In the case of large buildings composed of multiple floors, such as large marts and airports, robots may move between floors in large buildings by using a moving walkway (e.g., tilted moving walkway). However, when the robot uses the moving walkway, the robot needs to take an appropriate posture in consideration of a movement speed of the moving walkway or a tilt angle of the moving walkway.

Specifically, unlike stairs fixed to the ground, since the moving walkway moves, a robot getting on the moving walkway needs to take a stable posture in consideration of the movement speed of the moving walkway. In addition, unlike an escalator in which a plate parallel to the ground forms a stair and moves, a moving walkway that connects a travel space of different floors has a tilt angle, so a robot getting on a moving walkway needs to take a stable posture suitable for the tilt angle of the moving walkway.

However, the conventional robot could take a stable posture by detecting the movement speed and tilt angle of the moving walkway after getting on the moving walkway. However, the method has a problem in that the robot may not predict the movement speed and tilt angle of the moving walkway and take a stable posture in advance.

SUMMARY

The disclosed embodiments relate to a robot using a moving walk and a method of controlling the same.

A robot, may include: a camera: a driver comprising a plurality of wheels and a suspension for connecting each of the plurality of wheels to a body of the robot; and a processor. The processor may be configured to: identify both a movement direction of a moving walkway and a movement speed of the moving walkway based on a plurality of images of the moving walkway received from the camera after the processor identifies that the robot is located in an entrance area of the moving walkway, control the driver so that the robot faces an entering direction corresponding to the identified movement direction; control the suspension connected to at least one of the plurality of wheels so that the robot is tilted at an angle corresponding to the identified movement speed, and control the driver so that the tilted robot moves in the entering direction and enters the moving walkway.

The processor may be further configured to: identify a boundary line between a plurality of plates of the moving walkway based on the plurality of images received from the camera while the robot is located in the entrance area, identify the movement direction of the moving walkway based on a normal vector of the identified boundary line, and identify the movement speed of the moving walkway based on a movement speed of the identified boundary line.

The processor may be configured to: attempt to identify a plurality of plates of the moving walkway based on the plurality of images of the moving walkway received from the camera when after the processor identifies that the robot enters the moving walkway, identify a tilt angle of the moving walkway based on a normal vector of at least one of the identified plurality of plates, and control the suspension connected to the at least one of the plurality of wheels so that the robot stands upright based on the identified tilt angle.

The processor may be configured to identify the at least one of the plurality of plates based on the movement speed of the moving walkway and a response speed of the suspension.

The robot may further include a sensor. The processor may be further configured to control, based on the processor failing to identify the plurality of plates based on the plurality of images received from the camera while the robot enters the moving walkway, the suspension connected to the at least one of the plurality of wheels so that the robot stands upright based on a sensing value received from the sensor.

After the processor identifies that the robot is located within a predetermined distance from an exit area of the moving walkway, the processor may be configured to re-identify the movement direction of the moving walkway based on the plurality of acquired images, control the driver so that the robot faces an exiting direction corresponding to the re-identified movement direction, and control the driver so that the robot moves in the exiting direction and exits the moving walkway.

After the processor identifies that an object exists in the exit area, the processor may control the driver to move the robot in a direction opposite to the exiting direction.

When the identified tilt angle is within a predetermined angular range, the processor may be configured to identify that the robot is within the predetermined distance from the exit area of the moving walkway.

The processor may be further configured to: identify a width of the moving walkway based on the plurality of images received from the camera while the robot is located in the entrance area, determine an entrance location of the moving walkway of the robot based on the identified width of the moving walkway, and control the driver so that the robot faces the entering direction corresponding to the identified movement direction at the determined entrance location.

A method of controlling a robot includes: identifying both a movement direction of a moving walkway and a movement speed of the moving walkway based on a plurality of images of the moving walkway received from a camera after identifying that the robot is located in an entrance area of the moving walkway; controlling a driver of the robot so that the robot faces an entering direction corresponding to the identified movement direction; controlling a suspension of the driver, the suspension being connected to at least one of a plurality of wheels included in the driver, so that the robot is tilted at an angle corresponding to the identified movement speed; and controlling the driver so that the tilted robot moves in the entering direction and enters the moving walkway. Each of the plurality of wheels is connected to a body of the robot through the suspension.

The identifying both the movement direction of the moving walkway and the movement speed of the moving walkway may include: identifying a boundary line between a plurality of plates of the moving walkway based on the plurality of images received from the camera while the robot is located in the entrance area; identifying the movement direction of the moving walkway based on a normal vector of the identified boundary line; and identifying the movement speed of the moving walkway based on a movement speed of the identified boundary line.

The method may further include: attempting to identify a plurality of plates of the moving walkway based on the plurality of images of the moving walkway received from the camera after identifying that the robot enters the moving walkway; identifying a tilt angle of the moving walkway based on a normal vector of at least one of the identified plurality of plates; and controlling the suspension connected to the at least one of the plurality of wheels so that the robot stands upright based on the identified tilt angle.

The method may further include identifying the at least one of the plurality of plates based on the movement speed of the moving walkway and a response speed of the suspension.

The method may further include, after failing to identify the plurality of plates based on the plurality of images received from the camera while the robot enters the moving walkway, controlling the suspension connected to the at least one of the plurality of wheels so that the robot stands upright based on a sensing value acquired through a sensor of the robot.

The method may further include: after identifying that the robot is located within a predetermined distance from an exit area of the moving walkway, re-identifying the movement direction of the moving walkway based on the plurality of acquired images; controlling the driver so that the robot faces an exiting direction corresponding to the re-identified movement direction; and controlling the driver so that the robot moves in the exiting direction and exits the moving walkway.

The method may further include, after identifying that an object exists in the exit area, controlling the driver to move the robot in a direction opposite to the exiting direction.

The method may further include, when the identified tilt angle is within a predetermined angular range, identifying that the robot is within the predetermined distance from the exit area of the moving walkway.

The method may further include: identifying a width of the moving walkway based on the plurality of images received from the camera while the robot is located in the entrance area, determining an entrance location of the moving walkway of the robot based on the identified width of the moving walkway, and controlling the driver so that the robot faces the entering direction corresponding to the identified movement direction at the determined entrance location.

A non-transitory computer readable recording medium may include a program for executing a method of controlling a robot. The method may include: identifying both a movement direction of a moving walkway and a movement speed of the moving walkway based on a plurality of images of the moving walkway received from a camera after identifying that the robot is located in an entrance area of the moving walkway; controlling a driver of the robot so that the robot faces an entering direction corresponding to the identified movement direction; controlling a suspension of the driver, the suspension being connected to at least one of a plurality of wheels included in the driver, so that the robot is tilted at an angle corresponding to the identified movement speed; and controlling the driver so that the tilted robot moves in the entering direction and enters the moving walkway. Each of the plurality of wheels may be connected to a body of the robot through the suspension.

Identifying both the movement direction of the moving walkway and the movement speed of the moving walkway may include: identifying a boundary line between a plurality of plates of the moving walkway based on the plurality of images received from the camera while the robot is located in the entrance area; identifying the movement direction of the moving walkway based on a normal vector of the identified boundary line; and identifying the movement speed of the moving walkway based on a movement speed of the identified boundary line.

BRIEF DESCRIPTION OF THE DRAWINGS

FIG. 14 is a flowchart schematically illustrating a method of controlling a robot while the robot gets on the moving walk according to one or more embodiments of the disclosure.

FIG. 15 is a flowchart schematically illustrating a method of controlling a robot getting off a moving walk according to one or more embodiments of the disclosure.

DETAILED DESCRIPTION

Figure 1:
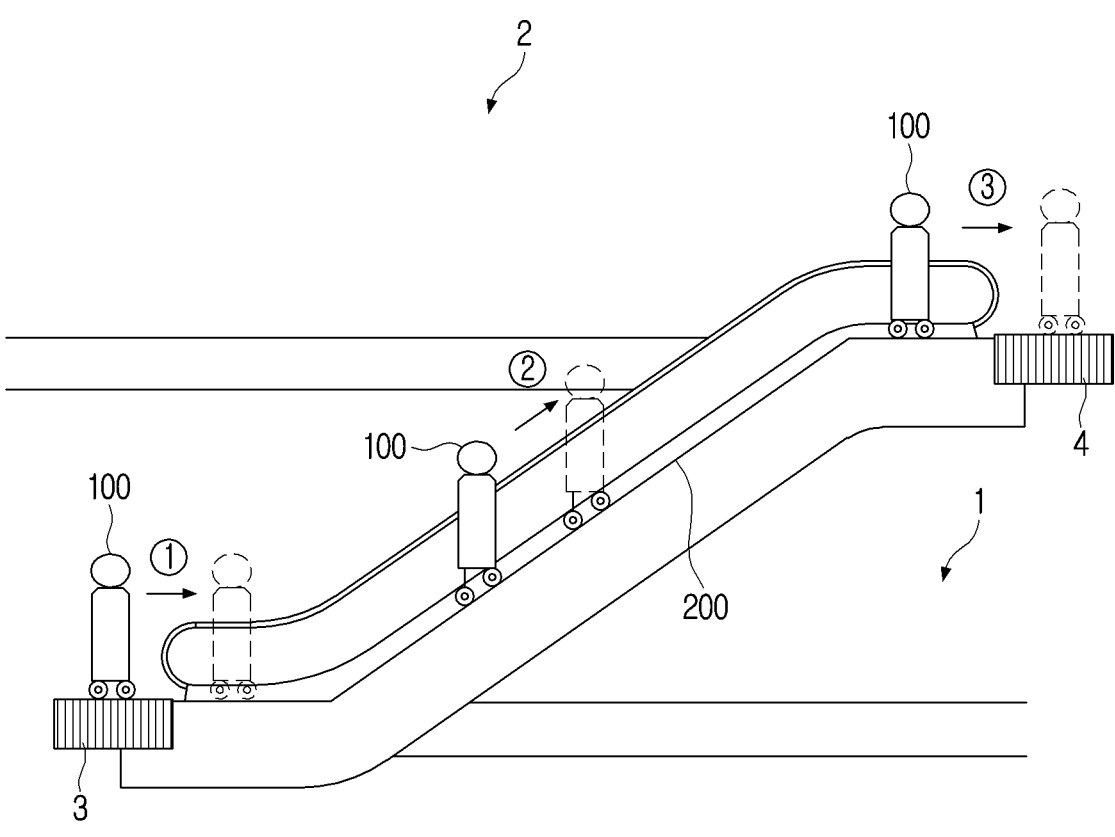
FIG. 1 is a schematic exemplary diagram of a robot using a moving walk according to one or more embodiments of the disclosure.

Since the disclosure may be variously modified and have several exemplary embodiments, specific exemplary embodiments will be illustrated in the drawings and be described in detail in the detailed description. However, it is to be understood that the disclosure are not limited to specific exemplary embodiments, but include all modifications, equivalents, and substitutions according to exemplary embodiments. Throughout the accompanying drawings, similar components will be denoted by similar reference numerals.

In describing the disclosure, when it is decided that a detailed description for the known functions or configurations related to the disclosure may unnecessarily obscure the gist of the disclosure, the detailed description therefor will be omitted.

In addition, the following exemplary embodiments may be modified in several different forms, and the scope and spirit of the disclosure are not limited to the following exemplary embodiments. Rather, these exemplary embodiments make the disclosure thorough and complete, and are provided to completely transfer the spirit of the disclosure to those skilled in the art.

Terms used in the disclosure are used only to describe specific exemplary embodiments rather than limiting the scope of the disclosure. Singular forms are intended to include plural forms unless the context clearly indicates otherwise.

In the disclosure, an expression "have," "may have," "include," "may include," or the like, indicates existence of a corresponding feature (for example, a numerical value, a function, an operation, a component such as a part, or the like), and does not exclude existence of an additional feature.

In the disclosure, an expression "A or B," at least one of "A or/and B," "one or more of A or/B," or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first", "second", "1st," "2nd," or the like, used in the disclosure may indicate various components regardless of a sequence and/or importance of the components, will be used only in order to distinguish one component from the other components, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component).

On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for," "having the capacity to," "designed to," "adapted to," "—made to," or "capable of" depending on a situation. A term "configured (or set) to" may not necessarily mean "specifically designed to" in hardware.

Instead, an expression "—an apparatus configured to" may mean that the apparatus "is capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In exemplary embodiments, a "module" or a "unit" may perform at least one function or operation, and be implemented by hardware or software or be implemented by a combination of hardware and software. In addition, a plurality of "modules" or a plurality of "~ers/ors" may be integrated in at least one module and be implemented by at least one processor except for a 'module' or an '~er/or' that needs to be implemented by specific hardware.

Various elements and regions in the drawings are schematically illustrated. Therefore, the spirit of the disclosure is not limited by relatively sizes or intervals illustrated in the accompanying drawings.

Hereinafter, embodiments will be described in detail with reference to the accompanying drawings so that those skilled in the art to which the disclosure pertains may easily practice.

FIG. 1 is a schematic exemplary diagram of a robot using a moving walkway according to one or more embodiments of the disclosure.

A moving walkway refers to a structure or mechanical device designed as a conveyor belt installed in a travel space so that, for example, people, cargo, and/or robots may move automatically. The moving walkway may be referred to as, for example, a moving walk, a moving sidewalk, a moving payment, an autowalk, and/or a travelator. In this specification, it will be referred to as a moving walkway for convenience of description.

A moving walkway 200 used by a robot 100 may include both a horizontal moving walkway that may be level with a floor surface to move within the same layer and a tilted moving walkway that may be formed to have a certain slope to move between floors.

The robot 100 may be implemented as various electronic devices such as a robot capable of performing an operation of purifying air while traveling in a building space, a housekeeping support type robot capable of performing operations such as arranging clothes and washing dishes while traveling in a home space, or a security type robot capable of performing security while traveling in building space.

However, the robot 100 is not limited thereto, and may be implemented as a variety of movable robots. For example, the robot 100 may be implemented as a robot vacuum cleaner capable of performing a cleaning operation while traveling in a home space, an autonomous driving vehicle capable of performing an operation instead of a human, an automated guided vehicle capable of moving items to a destination.

Referring to FIG. 1, the robot 100 uses the tilted moving walkway 200. The robot 100 may move travel spaces 1 and 2 of different floors through the tilted moving walkway 200.

In this case, the robot 100 may identify a movement speed and a movement direction of the moving walkway 200 before getting on the moving walkway 200 (①), and identify the posture of the robot based on the movement speed and movement direction. The identified posture of the robot may be a posture identified based on the movement speed and movement direction of the moving walkway 200 so that the robot 100 may stably get on the moving walkway 200. Accordingly, the robot 100 may fall when getting on the moving walkway 200 or mitigate an impact applied to an object or food mounted on the robot 100.

Also, the robot 100 may identify a tilt angle of the moving walkway 200 and identify a posture of the robot based on the tilt angle. The identified posture of the robot may be a posture identified based on the tilt angle of the moving walkway 200 so that the robot 100 may stably get on the moving walkway 200. More specifically, the posture identified based on the tilt angle of the moving walkway 200 may be a posture in which the robot 100 is standing so that the robot 100 stands upright with a work installed thereon. Accordingly, the robot 100 may transport objects or food mounted on the robot 100 more safely while getting on the moving walkway 200 moving with a tilt angle.

In addition, the robot 100 may identify the movement direction of the moving walkway 200 before getting off the moving walkway 200 (③), and identify a getting off direction (e.g., an exiting direction) of the robot 100 based on the identified movement direction. The identified getting off direction may be a direction that matches the movement direction of the moving walkway 200 so that the robot 100 may stably get off the moving walkway 200. Accordingly, the robot 100 may get off in the right direction when getting off the moving walkway 200.

A state before the robot 100 gets on the moving walkway 200 (①) is set as a getting on preparation mode, a state while the robot 100 is getting on the moving walkway 200 is set as a getting on mode, and a state before the robot gets off the moving walkway 200 (③) is set as a getting off mode, and the operation method of the robot 100 in each mode may be distinguished.

Hereinafter, the robot 100 using the moving walkway 200 will be described in detail.

Figure 2:
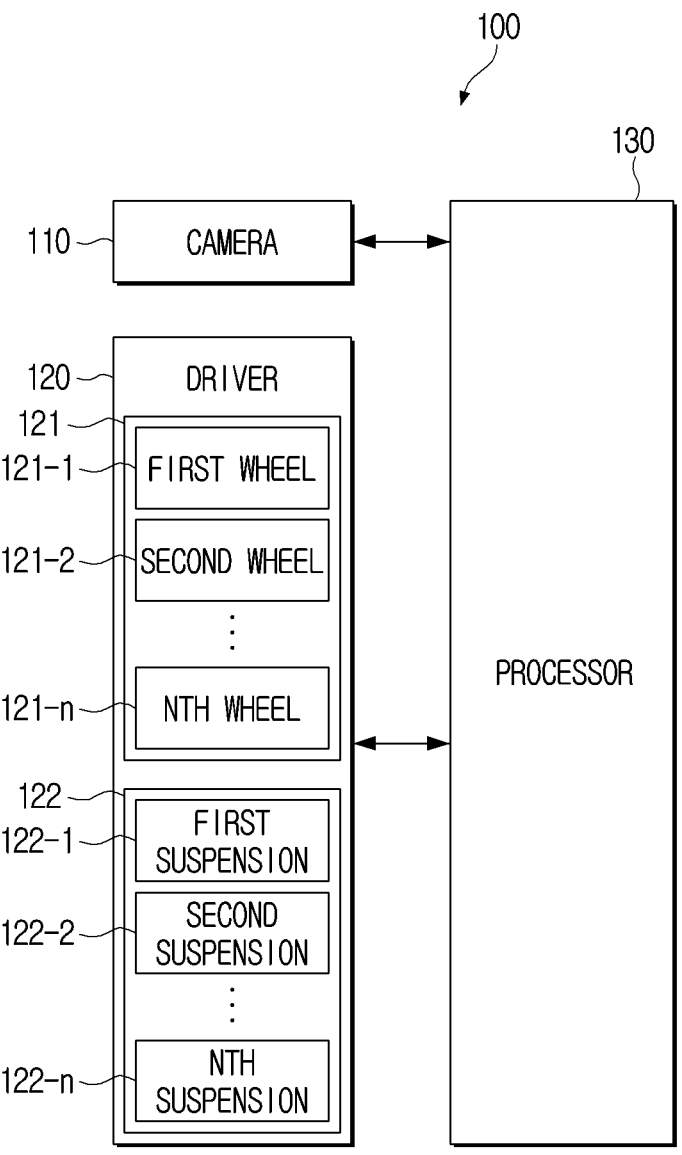
FIG. 2 is a schematic configuration diagram of the robot according to one or more embodiments of the disclosure.

FIG. 2 is a schematic configuration diagram of the robot 100 according to one or more embodiments of the disclosure. Referring to FIG. 2, the robot 100 includes a camera 110, a driver 120, and a processor 130.

The robot 100 may be divided into a head and a body. For example, a head of the robot 100 may include the camera 110 or a sensor to perform a function of acquiring images of objects around the robot 100 or detecting the objects. The body of the robot 100 may be connected to the driver 120 to move the robot 100 or perform a function of a frame supporting the robot 100. In this case, the head may be connected to a rotatable motor and attached to the body. Accordingly, the robot 100 may acquire information on the objects around the robot 100 by rotating the head 360° without controlling the driver 120. However, the embodiments are not limited thereto, and the robot 100 may be implemented as an integrated body in which the head and body are not distinguished, and in this case, the body and the head may be distinguished on the robot 100 according to the functions performed.

The camera 110 captures the objects around the robot 100 and acquires a plurality of images 10 of the objects. Specifically, the camera 110 may acquire the plurality of images 10 related to a getting on area 3 (e.g., an entrance area 3) and a getting off area 4 (e.g., an exit area 4) of the moving walkway 200 of the robot 100, and images of a fixed plate 210 and a plurality of movable plates 220 of the moving walkway 200. Also, the camera 110 may acquire images of objects (e.g., a person and/or an animal) existing in the getting off area 4.

To this end, the camera 110 may be implemented as an imaging device such as a CMOS image sensor (CIS) having a CMOS structure, and/or a charge coupled device (CCD) having a CCD structure. However, the camera 110 is not limited thereto, and the camera 110 may be implemented as a camera 110 module of various resolutions capable of capturing a subject.

The camera 110 may be implemented as a depth camera 110, a stereo camera 110, or an RGB camera 110. Accordingly, the camera 110 may acquire depth information of an object together with an image of the object.

The driver 120 is a device capable of traveling the robot 100. The driver 120 may adjust the driving direction and the driving speed under the control of the processor 130. The driver 120 according to an example may include a power generating device (e.g., a gasoline engine, a diesel engine, a liquefied petroleum gas (LPG) engine, an electric motor depending on fuel (or energy source) used) that generates power for the robot 100 to drive, and a steering device (e.g., manual steering, hydraulics steering, and/or electronic control power steering (EPS)) for controlling a driving direction.

The driver 120 operates a plurality of wheels 121 (first wheel 121, 121-1, second wheel 121, 121-2, . . . , n-th wheel 121, 121-*n*, where n is a natural number greater than or equal to 2). The plurality of wheels 121 move the robot 100 by rotating based on the control of the processor 130. Specifically, when receiving an electrical signal corresponding to control information (e.g., movement and/or movement speed) generated by the processor 130, the driver 120 may drive the power generating device and rotate the plurality of wheels 121, based on the received electrical signal.

Alternatively, based on the control of the processor 130, the robot 100 may rotate by rotating at least one of the plurality of wheels 121 or by changing a rotation speed of the plurality of wheels 121. Specifically, when receiving an electrical signal corresponding to control information (e.g., rotation direction and/or rotation speed) generated by the processor 130, the driver 120 may drive the power generating device and rotate at least one of the plurality of wheels 121, based on the received electrical signal. Alternatively, the driver 120 may receive electrical signals of different magnitudes for each wheel and rotate each wheel at different speeds.

Hereinafter, the processor 130 generates a control signal related to rotation and stop of the plurality of wheels 121 of the driver 120, transmits an electrical signal corresponding to the generated control signal to the driver 120, and it will be described that the processor 130 controls to rotate or stop the plurality of wheels 121 of the driver 120.

The driver 120 operates a plurality of suspensions 122 (first suspension 122-1, second suspension 122-2, . . . , n-th suspension 122-n, where n is a natural number greater than or equal to 2). The suspension 122 is a component for alleviating or absorbing shock generated between the traveling robot 100 and the floor surface.

The suspension 122 serves to connect each wheel to the robot 100 and the body. Accordingly, the suspension 122 may perform a function of mitigating shock generated between the robot 100 and the floor surface while the wheel 121 rotates to move the robot 100. To this end, the suspension 122 may be implemented as various suspension devices such as an air suspension 122 and a multi-link suspension 122.

The suspension 122 may be compressed or tensioned under the control of the processor 130. When the suspension 122 is compressed, the distance between the wheel 121 and the body of the robot 100 connected by the suspension 122 is reduced, and when the suspension 122 is tensioned, the distance between the wheel 121 and the body of the robot 100 connected by the suspension 122 may increase. Accordingly, the robot 100 may compress or tension the suspension 122 to change the posture of the robot.

Hereinafter, the processor 130 generates a control signal for tensioning or compressing the suspension 122 of the driver 120, transmits an electrical signal corresponding to the generated control signal to the driver 120, and it will be described that the processor 130 controls to tension or compress the suspension 122 of the driver 122.

Hereinafter, the robot 100 will be described as including four wheels 121 and four suspensions 122 connecting the four wheels 121 to the body of the robot 100. This is for convenience of description, and the robot 100 may be configured to have various numbers of wheels 121 and suspensions 122 according to one or more embodiments.

The robot 100 may include at least one sensor. At least one sensor may be implemented as sensors (e.g., Lidar sensor and/or ToF sensor) used to detect objects around the robot 100 and sensors (e.g., IMU sensor) for detecting the posture of the robot.

The processor 130 may control a general operation of the robot 100. To this end, the processor 130 may include, for example, a random access memory (RAM), a read only memory (ROM), a central processing unit (CPU), a graphic processing unit (GPU), and/or a system bus, and may execute calculations or data processing related to the control of one or more components included in the robot 100.

The processor 130 may control one or more components included in the robot 100 by executing one or more instructions stored in a storage, control one or more components as a hardware circuit or chip, or control one or more components as a combination of software and hardware.

The processor 130 may be electrically connected to various components in the robot 100 including the camera 110, the driver 120, at least one sensor (not illustrated), and the storage (not illustrated), and control these components.

When it is identified that the robot 100 is located in the getting on area 3 of the moving walkway 200, the processor 130 identifies the movement direction and movement speed of the moving walkway 200 based on the plurality of images 10 of the moving walkway 200 acquired through the camera 110.

Specifically, the processor 130 identifies that the robot 100 is located in the getting on area 3 of the moving walkway 200 based on map data of the travel space where the robot 100 is located. The map data is map data including information on a travel space set for the robot 100 to travel. The information on the travel space includes, for example, a traveling path of the robot 100 set in the travel space, location information such as a structure (e.g., moving walkway 200), a terrain, and/or an obstacle in the travel space. The map data may be stored in the memory of the robot 100 or may be received from an external server through a communication interface of the robot 100.

The robot 100 may move within the travel space according to a predetermined traveling path based on the map data. In this case, when the driving path is set on the moving walkway 200, the processor 130 may control the driver 120 so that the robot 100 moves to the moving walkway 200. However, the embodiments are not limited thereto, and the robot 100 may move in the travel space by tracking a user or an external electronic device communicating with the robot 100. In this case, when the user or the external electronic device moves to the moving walkway 200, the processor 130 may control the driver 120 to move the user or the external electronic device to the moving walkway 200.

The processor 130 may identify that the robot 100 is located in the getting on area 3 of the moving walkway 200 based on the map data.

The getting on area 3 means an area where a person or the robot 100 waits to get on the moving walkway 200. For example, the getting on area 3 may include the fixed plate 210 installed at a boarding gate of the moving walkway 200. The fixed plate 210 means the fixed plate installed at the boarding gate and exit of the moving walkway 200. The fixed plate 210 may also be referred to as a landing plate.

The fixed plate 210 is distinguished from the plurality of moving plates 220 forming the conveyor belt of the moving walkway 200. The moving plate 220 is disposed on an upper end of a roller of the moving walkway 200 and moves in a specific direction by a driver and a driving chain. The plate may also be referred to as, for example, a step, a footrest, and/or a stepping board.

The getting off area 3 may further include a floor surface around the exit of the moving walkway 200. For example, the getting on area 3 includes the fixed plate 210 installed at the boarding gate of the moving walkway 200, and may include a floor surface of a predetermined range around the fixed plate 210.

Such getting on area 3 may be set on the map data in advance. Accordingly, the processor 130 may identify that the robot 100 is located in the getting on area 3 based on the map data.

The processor 130 may identify that the robot 100 is located in the getting on area 3 by identifying a post beam installed on the fixing plate 210 of the getting on area 3. For example, when the post beam is recognized on an image acquired through the camera 110 while the robot 100 is traveling, the processor 130 may identify that the robot 100 is located in the getting on area 3. To this end, the processor 130 may use a neural network model trained to recognize the post beam.

The neural network model may be a convolutional neural network (CNN) that includes a convolutional layer extracting feature information of an image and a fully-connected layer trained to identify an object included in the image based on the extracted feature information. The neural network model may be stored in memory. In addition, the processor 130 may perform communication with the post beam of the getting on area 3 through the communication interface of the robot 100 to identify the distance between the robot 100 and the post beam. In this case, when the identified distance is within a predetermined distance, the processor 130 may identify that the robot 100 is located in the getting on area 3.

In addition, when the moving plate 220 is identified on the image acquired through the camera 110 while the robot 100 is traveling, the processor 130 may identify that the robot 100 is located in the getting on area 3. For example, the processor 130 may identify the moving plate 220 of the moving walkway 200 on an image acquired through the camera 110 while the robot 100 is traveling. Specifically, the processor 130 may repeatedly acquire the image of the moving walkway 200 through the camera 110 as the robot 100 moves to the moving walkway 200. The processor 130 may identify that the moving area of the moving walkway 200 gradually expands on the image acquired through the camera 110.

The moving area may be an area including the moving plate 220 of the moving walkway 200. Accordingly, as the robot 100 approaches the moving walkway 200, the processor 130 may identify that the moving area gradually expands on the image acquired in real time through the camera 110. The processor 130 may identify that the robot 100 is located in the getting on area 3 when the movement area is greater than or equal to a predetermined range.

In addition, the robot 100 may identify whether the robot 100 is located in the getting on area 3 through the neural network model trained to identify the getting on area 3 on the image. Specifically, by using the neural network model trained through the plurality of images (that is, training data) that may be obtained in various getting on areas 3 including the getting on area 3 of the moving walkway 200 in the travel space where the robot 100 is located, the processor 130 may identify whether the robot 100 is located in the getting on area 3. The neural network model that detects the getting on area 3 included in the image may be implemented as, for example, a convolutional neural network (CNN) model, a fully convolutional networks (FCN) model, a regions with convolutional neuron networks features (RCNN) model, and/or a YOLO model. The neural network model may be stored in the memory.

In this way, the processor 130 may identify that the robot 100 is located in the getting on area 3 by various methods.

The processor 130 acquires the plurality of images 10 of the moving walkway 200 through the camera 110 when it is identified that the robot 100 is located in the getting on area 3. The processor 130 identifies the movement direction and movement speed of the moving walkway 200 based on the plurality of acquired images 10 of the moving walkway 200.

Specifically, when it is identified that the robot 100 is located in the getting on area 3, the processor 130 may control the driver 120 to stop the robot 100. The processor 130 may acquire the plurality of images 10 of the moving walkway 200 through the camera 110 while the robot 100 is stopped.

In this case, the processor 130 may control the driver 120 so that the robot 100 moves in order to acquire the plurality of images 10. Specifically, when it is detected that the robot 100 is located in the getting on area 3, the processor 130 may control the driver 120 to move the robot 100 to an image acquisition point in the getting on area 3.

The image acquisition point may be a location set to acquire the image of the moving walkway 200 without interfering with the passage of a user or another robot 100 to get on the moving walkway 200. The image acquisition point may be set in advance for each getting on area on the map data.

Alternatively, the processor 130 may acquire at least one image of the moving walkway 200 through the camera 110 when it is identified that the robot 100 is located in the getting on area, and identify the width of the moving walkway 200 through at least one acquired image. The width of the moving walkway 200 may be identified based on the detection of the moving plate 220 in at least one acquired image and the detected width of the moving plate 220. The processor 130 may select the image acquisition point of the robot 100 based on the identified width of the moving walkway 200. As an example, based on the identified width of the moving walkway 200 and size information (e.g., length information on the body of the robot 100) on the body of the robot 100, the driver 120 may be controlled so that the robot 100 is located on one side of the boarding gate of the moving walkway 200.

The processor 130 may identify the movement direction and movement speed of the moving walkway 200 through the plurality of acquired images 10 of the moving walkway 200. Specifically, the processor 130 may detect the moving plate 220 within the plurality of acquired images 10 of the moving walkway 200. The processor 130 may identify the location of the moving plate 220 detected in each image and identify a change in the identified location of the moving plate 220. The processor 130 may identify the movement direction of the moving walkway 200 based on the change in the identified location of the moving plate 220, and may also identify the movement speed of the moving walkway 200 based on the change in the identified location of the moving plate 220 and a frame rate for the plurality of images 10.

Hereinafter, an embodiment for identifying the movement direction and movement speed of the moving walkway 200 will be described in detail.

Figure 3:
FIG. 3 is an exemplary diagram illustrating a method of identifying a movement direction and a movement speed of a moving walk according to one or more embodiments of the disclosure.

FIG. 3 is an exemplary diagram illustrating a method of identifying a movement direction and a movement speed of a moving walkway according to one or more embodiments of the disclosure.

Referring to FIG. 3, the processor 130 may acquire the plurality of images 11 and 12 of the moving walkway 200 in the getting on area 3 through the camera 110 when it is identified that the robot 100 is located in the getting on area 3. Specifically, the processor 130 may acquire a first image 11 of the moving walkway 200 at time t1 and acquire a second image 12 of the moving walkway 200 at time t2.

The processor 130 may set a region of interest (ROI) 20 of the plurality of images 10 acquired through the camera 110. Specifically, the processor 130 may identify a variable region within the image by comparing the plurality of acquired images 10. Since the fixed plate 210 within the plurality of images 10 remains fixed and does not move, the variable region may be identified based on the movement of the moving plate 220 detected within the plurality of images 10. The processor 130 may set a region corresponding to the variable region as the region of interest.

The processor 130 may identify a change in location of at least one moving plate 220 within the set region of interest.

Referring to FIG. 3, the processor 130 may identify the change in locations of the first moving plate 221 and the second moving plate 222 in the first image 11 and the second image 12. The processor 130 may identify the movement direction and movement speed of the moving walkway 200 based on the change in locations of each of the moving plates 220 (first moving plate 221 and second moving plate 222) in the first image 11 and the second image 12, respectively. In this case, the processor 130 may identify that the movement direction of the moving walkway 200 is north.

The processor 130 may set identifiers (e.g., plate ID) for each of the moving plates 220 detected in the plurality of images 10, and track each of the moving plates 220.

The processor 130 may identify a boundary line between the plurality of plates of the moving walkway 200 based on the plurality of images 10 acquired through the camera 110 while the robot 100 is located in the getting on area 3, identify the movement direction of the moving walkway 200 based on the normal vector 40 of the identified boundary line, and identify the movement speed of the moving walkway 200 based on the movement speed of the identified boundary line.

Figure 4:
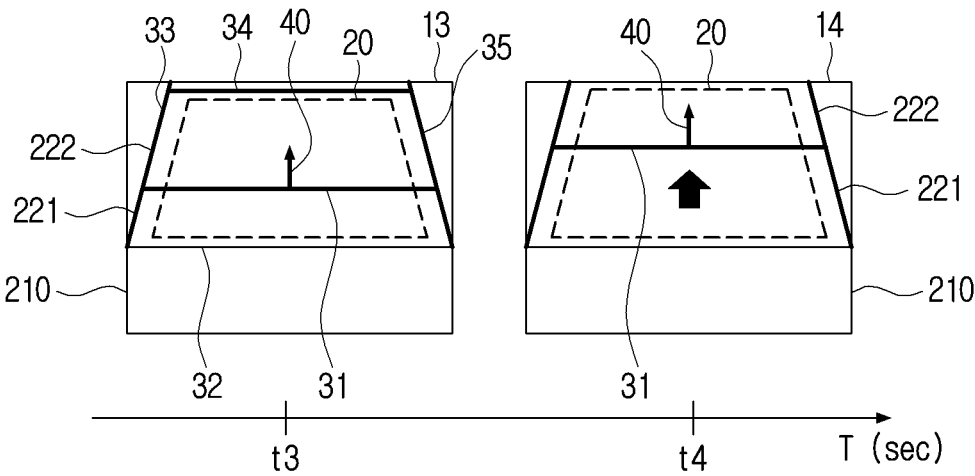
FIG. 4 is an exemplary diagram of a method of identifying a movement direction and a movement speed of a moving walk based on a boundary line between plates according to one or more embodiments of the disclosure.

FIG. 4 is an exemplary diagram of a method of identifying a movement direction and a movement speed of a moving walkway based on a boundary line between plates according to one or more embodiments of the disclosure.

Specifically, the processor 130 may acquire the plurality of images 10 of the moving walkway 200 through the camera 110 while the robot 100 is located in the getting on area 3, and identify the boundary line between the plurality of adjacent moving plates 220 of the moving walkway 200 based on the plurality of acquired images 10.

The processor 130 may extract linear components within each image by applying a linear detection algorithm to each of the plurality of images 10. For example, the processor 130 may extract linear components included in each image through Hough transformation. The extracted linear component may include the boundary between the fixed plate 210 and the moving plate 220, the boundary between the plurality of adjacent moving plates 220, a safety line marked on the moving plate 220, and a handrail of the moving walkway 200.

In this way, among the linear components extracted from each image, the processor 130 may identify the boundary line corresponding to the boundary between the plurality of adjacent moving plates 220. Specifically, the processor 130 may identify the linear components within the ROIs 20 set in each image as the boundary line between the moving plates 220. Alternatively, the processor 130 may identify feature information of each linear component, and select the boundary lines between the plurality of moving plates 220 from among the plurality of linear components based on the identified feature information. Alternatively, the processor 130 may compare the plurality of images 10 to detect linear components whose locations are changed in each image, and identify the detected linear components as the boundary lines between the plurality of moving plates 220.

The processor 130 may track the boundary line between the plurality of adjacent moving plates 220 identified in the plurality of images 10 and identify the movement directions and movement speed of the boundary line.

Specifically, the processor 130 may track the identified boundary line to identify the change in location of the boundary line in each image and identify the movement speed of the boundary line based on the identified change in location of the boundary line and the frame rate of each image.

Referring to FIG. 4, the processor 130 may detect the linear component included the ROI 20 set in a third image 13 acquired at time t3 and a fourth image 14 acquired at time t4, respectively.

Specifically, the plurality of linear components detected in the third image 13 and the fourth image 14 may include the boundary line between the fixed plate 210 and the moving plate 220, the boundary line between the handrail deck and the moving plate 200, and the boundary line between the plurality of adjacent moving plates 220. In this case, the processor 130 may identify the boundary lines between the plurality of moving plates 220 included in the ROI and track the identified boundary lines.

The processor 130 may extract the normal vector 40 of the boundary line between the plurality of adjacent moving plates 220 and identify the movement direction of the moving walkway 200 based on the extracted normal vector 40. Specifically, the processor 130 may identify the normal vector 40 perpendicular to the boundary line between the moving plates 220. The processor 130 may identify the direction of the identified normal vector 40 as the direction in which the location of the moving plate 220 is changed. For example, the processor 130 may identify a coordinate value of a boundary line in a 2-dimensional (2D) coordinate space based on the location of the boundary line between the moving plates 220 in an image, and identify the normal vector 40 of the boundary line in the 2D coordinate space based on the identified coordinate value.

Referring back to FIG. 4, the processor 130 may identify the boundary line 31 of the third moving plate 221 and the fourth moving plate 222 in the third image 13 and the fourth image 14 acquired at time t4, respectively, and may extract the normal vector 40 of the boundary line 31 in the fourth image. This may be identified based on the change in location of the boundary line 31 in the third image and the boundary line 31 in the fourth image. The processor 130 may identify the direction of the extracted normal vector 40 as the movement direction of the moving walkway 200.

The processor 130 may select at least one plate to be used to identify the movement direction and movement speed of the moving walkway 200 from among the plurality of moving plates 220 detected in the plurality of images 10 acquired through the camera 110.

Specifically, the processor 130 may acquire distance information on the plurality of moving plates 220 detected in the plurality of images 10. The distance information on the moving plate 220 may be acquired through the camera 110 (e.g., a stereo camera 110 and/or an RGB camera 110) and/or a sensor (a Lidar sensor and/or a ToF sensor). The processor 130 may obtain 3D location information (e.g., coordinate values in a predetermined 3D coordinate space) of the plurality of moving plates 220 based on the obtained distance information. The processor 130 may detect the moving plate 220 having the lowest height (e.g., z-axis location) among the plurality of moving plates 220 based on the 3D location information of the plurality of moving plates 220. The processor 130 may identify the movement direction and movement speed of the moving walkway 200 based on the detected change in location of the moving plate 220.

The processor 130 identifies the movement direction and movement speed of the moving walkway 200, and then controls the driver 120 so that the robot 100 faces a getting on direction (e.g., an entering direction) corresponding to the identified movement direction and controls the suspension 122 connected to at least one of the plurality of wheels 121 so that the robot 100 is tilted at an angle corresponding to the identified movement speed. The processor 130 may control the driver 120 so that the tilted robot 100 moves in the getting on direction and gets on the moving walkway 200.

Figure 5:
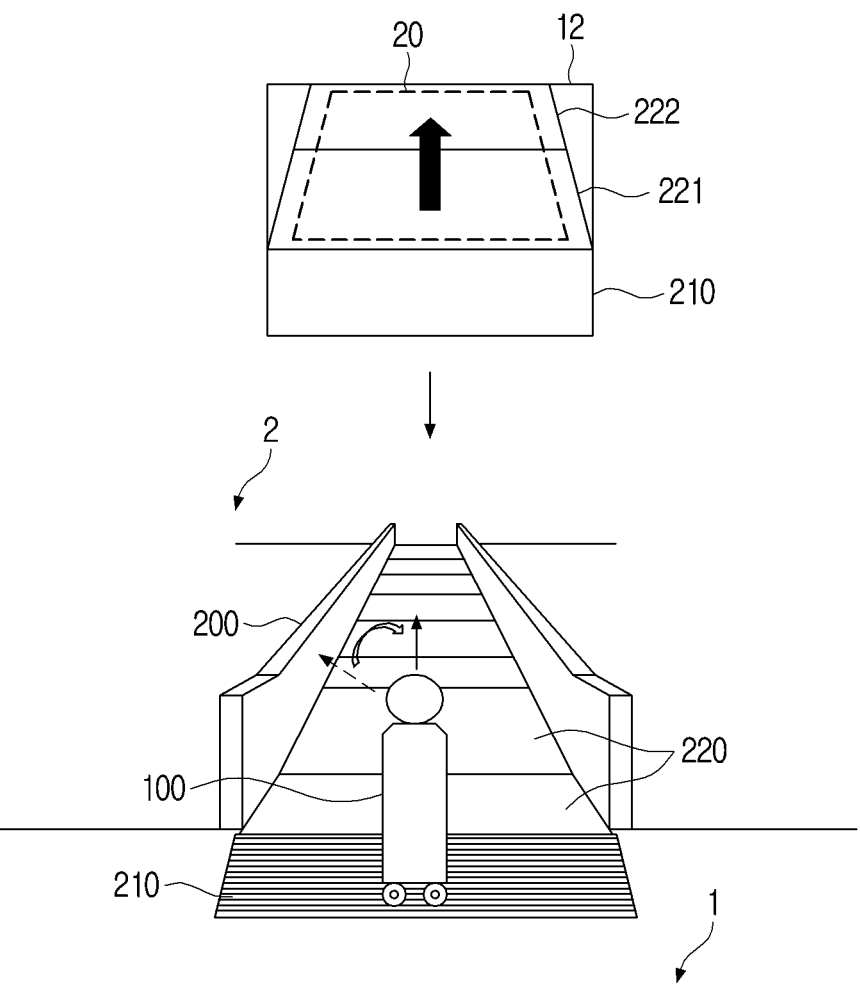
FIG. 5 is an exemplary diagram illustrating determining a getting on direction of a robot based on the movement direction of the moving walk according to one or more embodiments of the disclosure.
Figure 6:
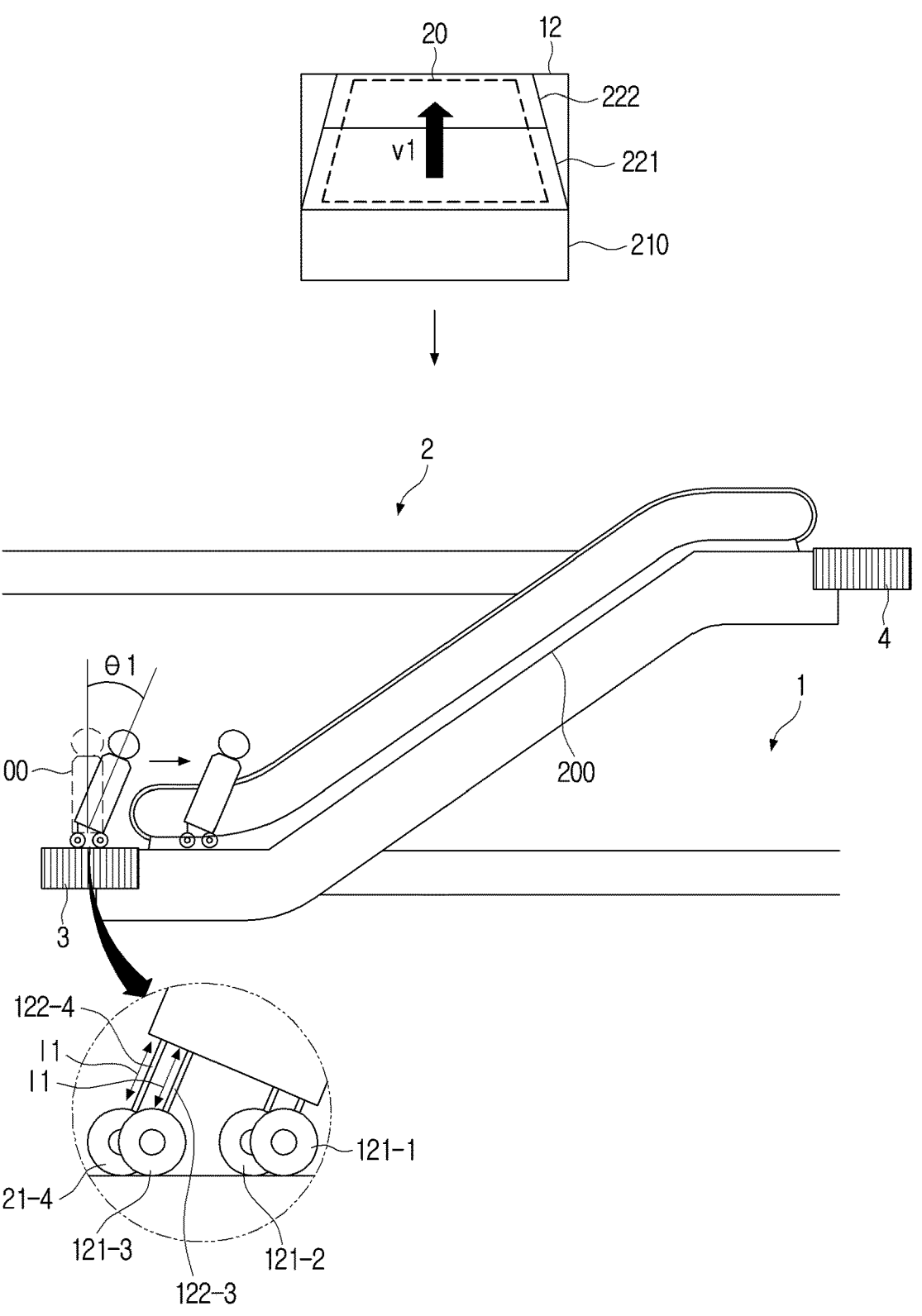
FIG. 6 is an exemplary diagram illustrating determining a tilt angle of the robot based on the movement speed of the moving walk according to one or more embodiments of the disclosure.

FIG. 5 is an exemplary diagram illustrating determining the getting on direction of the robot based on the movement direction of the moving walkway according to one or more embodiments of the disclosure, and FIG. 6 is an exemplary diagram illustrating determining a tilt angle of the robot based on the movement speed of the moving walkway according to one or more embodiments of the disclosure.

Specifically, the processor 130 may identify the getting on direction of the robot 100 based on the identified movement direction of the moving walkway 200. For example, the processor 130 may identify the direction of the normal vector 40 of the boundary line between the moving plates 220 of the moving walkway 200 as the getting on direction of the robot 100. That is, the processor 130 may identify the movement direction of the moving walkway 200 as the getting on direction of the robot 100.

The processor 130 may control the driver 120 so that the robot 100 faces the identified getting on direction. That is, the processor 130 may control the driver 120 of the robot 100 so that the vector that the body of the robot 100 faces matches the extracted normal vector 40. To this end, the processor 130 may generate the control information based on the movement direction of the moving walkway 200, and rotate the wheel 121 included in the driver 120 based on the generated control information to control the robot 100 to face the getting on direction. That is, the processor 130 may control the driver 120 to align the robot 100 in the movement direction of the moving walkway 200.

Referring to FIG. 5, the processor 130 identifies the movement direction of the moving walkway 200 as north. In this case, the processor 130 may identify the getting on direction of the moving walkway 200 of the robot 100 as north based on the movement direction of the moving walkway 200. The processor 130 may rotate the wheel so that the robot 100 faces north which is the getting on direction. Accordingly, the robot 100 facing the northeast direction may rotate in the north direction matching the movement direction of the moving walkway 200.

The processor 130 may control the driver 120 so that the robot 100 faces the getting on direction, and then control the suspension 122 connected to at least one of the plurality of wheels 121 so that the robot 100 is tilted at an angle corresponding to the identified movement speed of the moving walkway 200.

Specifically, the processor 130 may control the driver 120 to identify an angle corresponding to the movement speed of the moving walkway 200 when the robot 100 is aligned toward the getting on direction. The processor 130 may identify the angle corresponding to the movement speed of the moving walkway 200 as a pitch angle of the robot 100. In this case, it may be identified in consideration of the angle corresponding to the movement speed of the moving walkway 200 is, for example, the movement speed of the moving walkway 200, a friction coefficient of the moving plate 220, a weight of the robot 100, and/or a weight of the object loaded on the robot 100.

For example, the angle corresponding to the movement speed of the moving walkway 200 may be identified based on Equation 1 below.

Equation 1

$$\theta = c \times \tan - 1 \frac{v}{mg} \qquad \text{(Equation 1)}$$

$\theta$ denotes an angle corresponding to the movement speed of the moving walkway 200, v denotes the movement speed of the moving walkway 200, m denotes a mass of the robot 100, g denotes a gravitational acceleration, and c denotes a coefficient set in consideration of the, for example, friction coefficient of the moving plate 220.

The processor 130 may control the suspension 122 connected to at least one of the plurality of wheels 121 so that the robot 100 is tilted at the angle corresponding to the movement speed of the moving walkway 200 which is identified based on the movement speed of the moving walkway 200. Specifically, the processor 130 may identify the lengths of the suspensions 122 of each of the plurality of wheels 121 so that the robot 100 is tilted at the angle corresponding to the movement speed of the moving walkway 200, and may identify at least one wheel for which the length of the suspension 122 should be changed from among the plurality of wheels 121. The processor 130 may generate control information so that the length of the suspension 122 of at least one identified wheel is adjusted, and may control the driver 120 based on the generated control information so that the robot 100 is tilted at the angle corresponding to the movement speed of the moving walkway 200.

For example, the processor 130 may control the suspension 122 connected to at least one of the plurality of wheels 121 to be tensioned, or the processor 130 may control the suspension 122 connected to at least one of the plurality of wheels 121 to be compressed, so the robot 100 may be tilted at the angle corresponding to the identified movement speed of the moving walkway 200.

Referring to FIG. 6, the processor 130 may control the suspension 122 connected to the third wheel 121 and the fourth wheel 121, respectively, located at the rear of the plurality of wheels 121 so that the robot 100 moves at an angle $\theta 1$ corresponding to an identified movement speed v1 of the moving walkway 200. Specifically, in FIG. 6, the processor 130 tensions the suspension 122 connected to the third wheel 121 and the suspension 122 connected to the fourth wheel 121 so that the robot 100 is tilted.

The processor 130 controls the driver 120 so that the tilted robot 100 moves in the getting on direction and gets on the moving walkway 200 after the robot 100 is tilted at the angle corresponding to the movement speed of the moving walkway 200.

Specifically, the processor 130 may control the driver 120 to move toward getting on direction while the robot 100 is tilted at the angle corresponding to the movement speed of the moving walkway 200. In this case, the processor 130 may determine the movement speed (that is, getting on speed) for the robot 100 to get on the moving walkway 200 based on the movement speed of the moving walkway 200. For example, the processor 130 may determine the getting on speed of the moving walkway 200 as a speed increased by a predetermined ratio from the identified speed of the moving walkway 200.

As in one embodiment described above, the processor 130 may identify the movement direction and movement speed of the moving walkway 200 on which the robot 100 intends to get, based on the image acquired through the camera 110 in the getting on area 3. The posture of the robot suitable for the identified movement direction and movement speed and the movement direction of the robot 100 are determined. In particular, although the movement direction and movement speed may be different for each of the moving walkways 200, the robot 100 may distinguish and identify the movement direction and movement speed of each of the moving walkways 200. In addition, after the robot gets on the moving walkway 200, the posture of the robot is not determined in consideration of the movement direction and movement speed of the moving walkway 200, and before the robot 100 gets on the moving walkway 200, since the getting on posture of the robot 100 is determined in consideration of the movement direction and movement speed of the moving walkway 200 in advance, it is possible to stably get the robot 100 on the moving walkway 200.

The processor 130 may identify the width of the moving walkway 200 based on the plurality of images 10 acquired through the camera 110 while the robot 100 is located in the getting on area 3, determine a getting on location (e.g., an entrance location) of the moving walkway 200 of the robot 100 based on the identified width of the moving walkway 200, and control the driver 120 to face the getting on direction corresponding to the identified movement direction of the robot 100 at the determined getting on location.

Specifically, the processor 130 may identify the width of the moving walkway 200 based on the plurality of images 10 acquired through the camera 110 while the robot 100 is located in the getting on area 3. The processor 130 may identify the width of the moving walkway 200 based on the length information of the boundary line between the moving plates 220 detected in the image. Alternatively, the processor 130 may identify the width of the moving walkway 200 based on the width of the ROI set in the image.

In this way, the processor 130 may determine the getting on location of the moving walkway 200 of the robot 100 based on the identified width of the moving walkway 200. For example, the processor 130 may determine the getting on location of the robot 100 as the center of the moving walkway 200 based on the width of the moving walkway 200. The processor 130 may control the driver 120 so that the robot 100 is located at the determined getting on location. In addition, the processor 130 may control the driver 120 so that the robot 100 faces the getting on direction corresponding to the identified movement direction of the robot 100 at the determined getting on position. The processor 130 may control the suspension 122 connected to at least one wheel so that the robot 100 is tilted at the angle corresponding to the movement speed of the moving walkway 200, and control the driver 120 so that the tilted robot 100 moves in the getting on direction from the determined getting on location and gets on the moving walkway 200.

Hereinafter, referring to FIGS. 7 to 9, a detailed method of aligning the posture of the robot based on the tilt angle of the moving walkway 200 after the robot 100 gets on the moving walkway 200 will be described.

When it is identified that the robot 100 gets on the moving walkway 200, the processor 130 may identify the plurality of plates of the moving walkway 200 based on the plurality of images 10 of the moving walkway 200 acquired through the camera 110.

Specifically, the processor 130 may identify whether the robot 100 gets on the moving walkway 200. In this case, the processor 130 may identify that the robot 100 gets on the moving walkway 200 when it is identified that the location of the robot 100 is changed without the control of the driver 120 on the map data. Alternatively, when the processor 130 detects that the plurality of wheels 121 of the driver 120 are located on the moving walkway 200, the processor 130 may identify that the robot 100 gets on the moving walkway 200.

When it is identified that the robot 100 gets on the moving walkway 200, the processor 130 may control the driver 120 so that the robot 100 stops, and acquire the plurality of images 10 of the moving walkway 20 through the camera 110 while the robot 100 stops.

In this case, the processor 130 may control the suspension 122 of at least one of the plurality of wheels 121 so that the tilted robot 100 stands upright prior to acquiring the plurality of images 10 or while acquiring the plurality of images 10.

Specifically, the processor 130 may restore the tilted robot 100 to its original state based on the movement speed of the moving walkway 200. The original state of the robot 100 may be a state of the robot 100 before getting on the moving walkway 200 or a state in which the robot 100 is upright. The state in which the robot 100 stands upright may be the state in which the robot 100 is parallel to the floor surface where the moving walkway 200 is installed. For example, the processor 130 may control the suspension 122 connected to the tensioned at least one wheel to be compressed based on the movement speed of the moving walkway 200, or control the suspension 122 connected to at least one compressed wheel to be tensioned based on the movement speed of the moving walkway 200, so that the robot 100 may be parallel to the floor surface on which the moving walkway 200 is installed.

In addition, when it is identified that the processor 130 gets on the moving walkway 200, the processor 130 may align the robot 100 based on the identified getting on direction. For example, when the robot 100 gets on the moving walkway 200, by, for example, the frictional force generated between the moving walkway 200 (e.g., the moving plate 220 of the moving walkway 200) and the robot 100 (e.g., the wheel 121 of the robot 100), the direction of the robot 100, which matches the movement direction of the moving walkway 200, may be distorted when getting on.

Accordingly, when it is identified that the robot 100 gets on the moving walkway 200, the processor 130 may identify whether the robot 100 is aligned toward the movement direction of the moving walkway 200 immediately after the robot 100 gets on the moving walkway 200 based on the getting on direction identified before getting on. When it is identified that the robot 100 is not aligned toward the movement direction of the moving walkway 200, the processor 130 may control the wheel 121 of the driver 120 so that the robot 100 is aligned in the movement direction of the moving walkway 200 based on the getting on direction identified before getting on.

The processor 130 may identify the plurality of plates of the moving walkway 200 within the plurality of acquired images 10. The plurality of plates identified in the plurality of images 10 acquired while the robot 100 is stationary on the moving walkway 200 may be the moving plate of the moving walkway 200 described above.

However, unlike the moving plate 220 identified in the plurality of images 10 acquired in getting on area 3, the change in location of the moving plate 220 may not be identified in the plurality of images 10 acquired while the robot 100 gets on the moving walkway 200. This is because while the robot 100 gets on the moving robot 100, the robot 100 and the moving plate 220 move at the same movement speed. That is, the relative speed between and the moving plate 220 and the robot 100 on the moving walkway 200 has a value of '0'.

The processor 130 may identify the plurality of moving plates 220 of the moving walkway 200 through the plurality of images 10 acquired through the camera 110. In this case, the plurality of moving plates 220 identified by the processor 130 through the plurality of images 10 may include the plurality of moving plates 220 located in front of the robot 100 and the moving plate below the robot 100 on which robot 100 is standing.

The processor 130 may identify the distance between the robot 100 and each of the moving plates 220 through the plurality of acquired images 10. For example, the processor 130 may identify the distances between the plurality of moving plates 220 and the robot 100, respectively, through the plurality of images 10 acquired by the camera 110 implemented as, for example, the depth camera 110 and/or the stereo camera 110. The processor 130 may identify the locations of each of the moving plates 220 with respect to the robot 100 based on the identified distance between each of the moving plates 220. For example, the processor 130 may identify the identified locations of each of the moving plates 220 in the 3D coordinate space 300.

The processor 130 may identify the plurality of moving plates 220 using the sensor (e.g., Lidar sensor or ToF sensor) of the robot 100. For example, the processor 130 may identify a location where a laser emitted from the Lidar sensor is reflected after reaching objects around the robot 100 as a point. The processor 130 may identify a set of clustered points corresponding to each of the moving plates 220 among the identified plurality of points. In this case, the processor 130 may identify a set of clustered points corresponding to each of the moving plates 220 based on, for example, a random sample consensus (RANSAC) technique and/or a principal component analysis (PCA) technique.

In this way, the processor 130 may identify the plurality of moving plates 220 around the robot 100, and identify the distance of each of the moving plates 220 from the robot 100 and the locations of each plate within the 3D coordinate space 300.

The processor 130 may identify the plurality of moving plates 220 by combining the plurality of images 10 acquired through the camera 110 and the sensing information (point cloud about the plate) acquired through the sensor.

In addition, the processor 130 may identify the plurality of plates within the plurality of images 10 acquired through the camera 110 by various methods, and identify locations of each of the plurality of identified plates.

Figure 7:
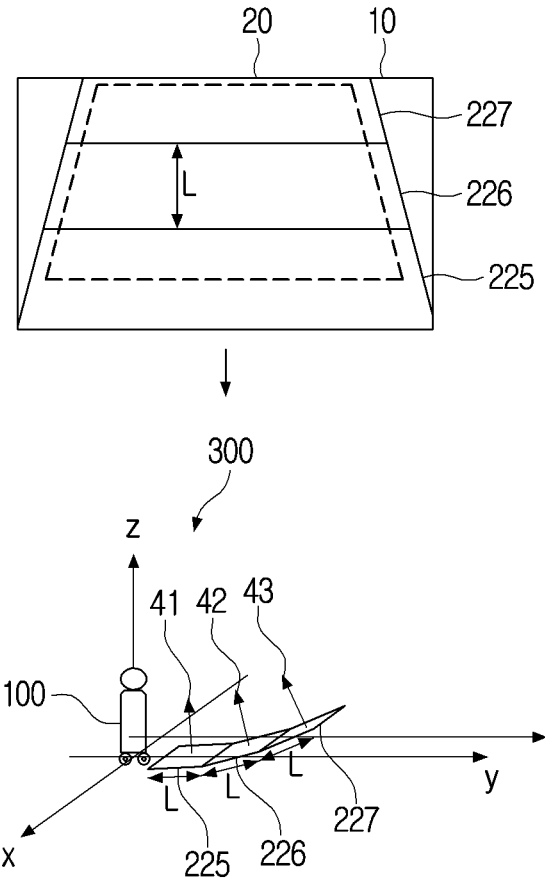
FIG. 7 is an exemplary diagram illustrating that a robot getting on a moving walk identifies a plurality of plates according to one or more embodiments of the disclosure.

FIG. 7 is an exemplary diagram illustrating that the robot 100 getting on the moving walkway 200 identifies the plurality of plates according to one or more embodiments of the disclosure.

Referring to FIG. 7, the processor 130 may detect the plurality of moving plates 220 (i.e., a fifth moving plate 225, a sixth moving plate 226, and a seventh moving plate 227) on the image acquired through the camera 110. The processor 130 may identify the locations of each plate in the predetermined 3D coordinate space 300 based on the distance information of each plate acquired through the camera 110 or the sensor.

In addition, the processor 130 may apply a Hough transform to each image in order to detect the plurality of moving plates 220 on each image, as in the getting on area described above, or set identifiers for the plurality of detected moving plates 220. In this regard, the contents described with reference to the operation of the processor 130 in the getting on area may be equally applied.

After identifying the plurality of moving plates 220 of the moving walkway 200, the processor 130 may identify the tilt angle of the moving walkway 200 based on the normal vector 40 of at least one of the plurality of identified moving plates 200.

Specifically, the processor 130 may extract the normal vectors 40 of the plurality of identified moving plates 220, respectively. For example, the processor 130 may identify surfaces 225', 226', and 227' corresponding to each of the moving plates 220 based on the location information of each of the moving plates 220 identified in the 3D coordinate space 300. In this case, the coordinates of the surfaces 225', 226', and 227' corresponding to each of the moving plates may be identified by, for example, a matrix, a vector.

The processor 130 may extract the normal vectors 40 to the surfaces 225', 226', and 227' corresponding to each of the moving plates. In this case, each normal vector 40 to the surfaces 225', 226', and 227' corresponding to each of the moving plates may be extracted in the same z-axis direction (e.g., +z-axis direction). In this case, for example, the processor 130 may extract the normal vectors to the surfaces 225', 226', and 227' corresponding to each of the moving plates 220 based on, for example, a least square method. Referring back to FIG. 7, the processor 130 may extract the normal vector 41 to the surface 225' corresponding to the fifth moving plate 225 on the 3D coordinate space 300 based on the location information of each of the moving plates, extract the normal vector 42 to the surface 226' corresponding to the sixth moving plate 226, and extract the normal vector 43 to the surface 227' corresponding to the seventh moving plate 227.

After extracting the normal vector 40 of the moving plate 220 in this way, the processor 130 may identify the tilt angle of the moving walkway 200 based on each of the normal vectors.

Specifically, the processor 130 may identify the location and direction of each normal vector 40 based on the posture of the robot and identify the tilt angle (specifically, the tilt angle between each moving plate and the floor surface where the moving walkway 200 is installed) formed by each of the moving plates.

For example, when the processor 130 controls the driver 120 after the robot 100 gets on the moving walkway 200 so that the robot 100 is upright (or parallel to the floor surface on which the moving walkway 200 is installed), the processor 130 may identify the angle between the normal vector of the robot 100 and each of the moving plates in the 3D coordinate space 300, and identify the tilt angle formed by each of the moving plates based on the identified angle.

Hereinafter, for convenience of description, it is assumed that an x component of the normal vector identified in the 3D coordinate space 300 is '0'.

Figure 8:
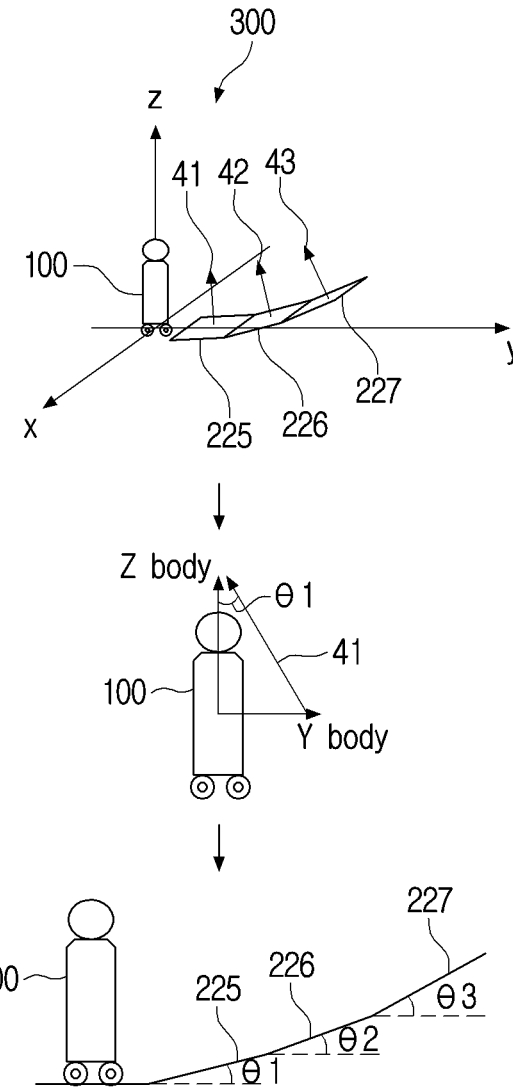
FIG. 8 is an exemplary diagram of a method of identifying a tilt angle of a moving walk based on a normal vector of a plate according to one or more embodiments of the disclosure.

FIG. 8 is an exemplary diagram of a method of identifying a tilt angle of a moving walkway 200 based on a normal vector of a plate according to one or more embodiments of the disclosure.

Referring to FIG. 8, the processor 130 may extract the normal vector 41 of the fifth moving plate 225, and identify the location and direction of the normal vector with respect to the robot 100 in the 3D coordinate space 300. Specifically, the processor may identify □1 as the tilt angle of the fifth moving plate 225 based on the vector (i.e., the vector of the y component) in the direction that the robot body faces, a vector (i.e., the z-component vector) in the perpendicular direction of the header and body of the robot, and the normal vector 41 corresponding to the fifth moving plate 225. The processor 130 may extract the normal vector 42 corresponding to the sixth moving plate 226, and identify the location and direction of the normal vector 42 with respect to the robot 100 in the 3D coordinate space 300. Based on the location and direction of the normal vector, θ2, which is the tilt angle of the sixth moving plate 226, may be identified. Similarly, the processor 130 may identify θ3, which is the tilt angle of the seventh moving plate 227, based on the normal vector 43 of the seventh moving plate 227.

Figure 9:
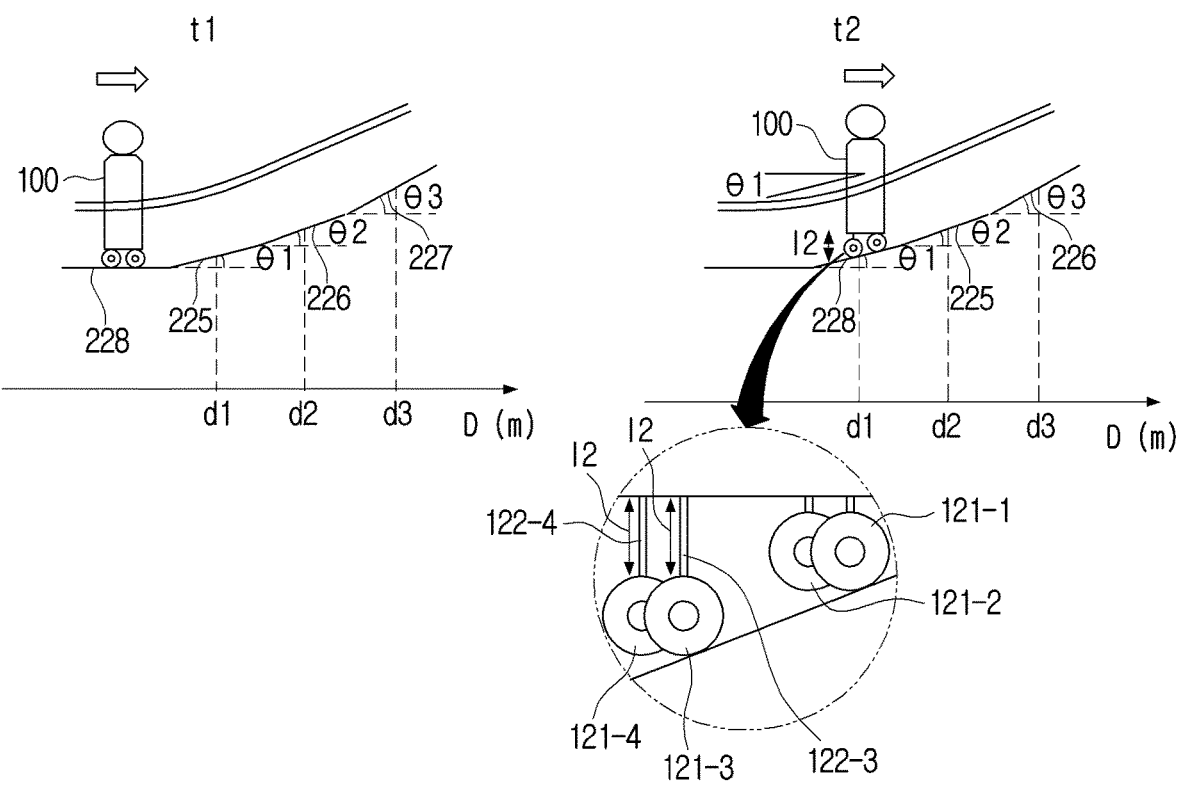
FIG. 9 is an exemplary diagram of a method of controlling a suspension of at least one wheel of a robot based on an identified tilt angle according to one or more embodiments of the disclosure.

FIG. 9 is an exemplary diagram of a method of controlling a suspension of at least one wheel of a robot based on an identified tilt angle according to one or more embodiments of the disclosure.

The processor 130 may control the suspension 122 of at least one wheel so that the robot 100 stands upright based on the identified tilt angle. That is, the suspension 122 of at least one wheel may be controlled so that the robot 100 is parallel to the floor surface on which the moving walkway 200 is installed.

Specifically, the processor 130 may identify rotation angles (roll angle and pitch angle) of the robot 100 based on the identified tilt angle. The processor 130 may tension or compress the suspension 122 of at least one wheel so that the robot 100 rotates based on the identified rotation angle of the robot 100.

The processor 130 may identify the tilt angles of the plurality of moving plates 220 located in front of the robot 100, respectively, and then identify the time when the moving plate 220 on which the robot 100 is standing moves to the location of the moving plate 220 located in the front.

For example, referring to FIG. 9, the eighth moving plate 228 on which the robot 100 is standing moves to a point, where the fifth moving plate 225 is located at time t1, at time t2. In this case, the processor 130 may predict the tilt angle of the eighth moving plate 228 where the robot 100 is located at time t2 based on the tilt angle of the fifth moving plate 225 identified based on the image acquired at time t1.

Accordingly, when the eighth moving plate 228 on which the robot 100 is standing at time t1 passes through d1 and moves to d2 (i.e., the location of the fifth moving plate 225 at time t1), the processor 130 may control, based on the identified tilt angle, the suspension 122 of at least one wheel so that the robot 100 is parallel to the floor surface on which the moving walkway 200 is installed. For example, in FIG. 9, based on the identified tilt angle θ1, the processor 130 may tension suspensions (i.e., the third suspension 122-3 and the fourth suspension 122-4) connected to the third and fourth wheels 121-3 and 121-4 of the robot 100, respectively. Specifically, the processor 130 may generate the control information on each of the third suspension 122-3 and the fourth suspension 122-4 so that the lengths of the third suspension 122-3 and the fourth suspension 122-4 are increased by l2, and tension each of the third suspension 122-3 and the fourth suspension 122-4 based on the generated control information.

Accordingly, the robot 100 may be parallel to the floor surface on which the moving walkway 200 is installed at time t2. In FIG. 9, it is illustrated that only the pitch angle of the robot 100 is adjusted, but this is only for convenience of description, and the processor 130 may adjust a yaw angle along with a pitch angle of the robot 100 based on the tilt angle of each moving plate 220.

The time when the processor 130 controls, based on the identified tilt angle, the suspension 122 of at least one wheel so that the robot 100 is parallel to the floor surface on which the moving walkway 200 is installed may be set based on the movement speed of the moving walkway 200 and the length information of the moving plate 220. That is, referring to FIG. 9 again, the processor 130 may determine based on the movement speed v of the moving walkway 200 and the length information l of the moving plate 220 that the eighth moving plate 228 where the robot 100 is located at time t1 is located at d2 (i.e., the location of the fifth moving plate 225 at time t1) at time t2. Accordingly, the processor 130 may control the suspension 122 of at least one wheel based on the tilt angle of the fifth moving plate 225 identified at time t1 just before time t2 arrives (e.g., before a predetermined time from time t2). Accordingly, even if the eighth moving plate 228 on which the robot 100 is standing moves at d2, the robot 100 may be parallel to the floor surface as in d1.

Although not clearly illustrated in the drawings, based on the movement speed v of the moving walkway 200 and the length information l of the moving plate 220, the processor 130 may determine that the eighth moving plate 228 on which the robot 100 is located at time (e.g., time t3) after time t2 is located at d3 (i.e., location of the sixth moving plate at time t1). The length information l of the moving plate 220 may be identified based on, for example, the distance information on the moving plate 220 acquired through the camera 110 and/or the point cloud of the moving plate 220 acquired through the sensor.

In this case, the processor 130 may control the suspension 122 of at least one wheel of the robot 100 based on the tilt angle of the sixth moving plate identified at time t1. For example, the processor 130 may identify the difference between the tilt angle of the fifth movement plate 225 identified at time t1 and the tilt angle of the sixth movement plate 226 based on the normal vector of the fifth movement plate 225 and the normal vector of the sixth movement plate. The processor 130 may generate, based on the difference in the identified tilt angle, the control information for the suspension 122 connected to at least one wheel so that the robot 100 at time t3 based on the posture of the robot at time t2 is parallel to the floor surface on which the moving walkway 200 is installed. The processor 130 may adjust the posture of the robot 100 so that the robot 100 is parallel to the floor surface at time t3 based on the generated control information (e.g., tension or compression length information of the suspension 122 connected to at least one wheel).

However, the embodiments are not limited thereto, and the processor 130 may re-extract the normal vector of the fifth moving plate 225 located at d3 through the plurality of images 10 acquired at time t2, and may identify the location and direction of the normal vector of the fifth moving plate 225 based on the posture (i.e., the horizontal posture of the robot 100 relative to the floor surface) of the robot at time t2 within the 3D coordinate space 300.

The processor 130 may identify the tilt angle of the fifth moving plate 225 at time t2. In this case, the processor 130 may identify a relative angle difference between the eighth moving plate 228 and the fifth moving plate 225 where the robot 100 is located at time t2. The processor 130 may control the suspension 122 connected to at least one wheel so that the robot 100 is parallel to the floor surface on which the moving walkway 200 is installed, based on the identified relative angle difference or the tilt angle of the fifth moving plate 225.

In this way, the processor 130 may again identify the plurality of moving plates 220 of the moving walkway 200 based on the image acquired through the camera 110 even after controlling the suspension 122 of at least one wheel so that the robot 100 is parallel to the floor surface on which the moving walkway 200 is installed based on the identified tilt angle, and continuously identify the tilt angle of the moving walkway 200 based on the normal vector of at least one of the identified plurality of plates 220. Accordingly, even if the tilt angle of the moving plate 220 on which the robot 100 is located is changed, the processor 130 may predict the tilt angle of the moving plate 220 in advance and control the posture of the robot to be level with the floor surface.

The processor 130 may control the suspension 122 connected to at least one wheel based on the identified tilt angle while the robot 100 gets on the moving walkway 200, and may rotate at least one wheel to adjust the direction of the robot 100. Specifically, the processor 130 may identify the boundary line between the plurality of moving plates 220 based on the image of the moving walkway 200 acquired through the camera 110.

That is, similar to what was done in getting on area 3, the processor 130 may detect a boundary line between the plurality of moving plates 220 of the moving walkway 200 through a straight line detection algorithm (e.g., Hough transform). The processor 130 may extract the normal vector of the detected boundary line and continuously identify the movement direction of the moving walkway 200 based on the extracted normal vector. The processor 130 may control the driver 120 to rotate at least one wheel so that the posture of the robot faces the movement direction of the moving walkway 200.

The processor 130 may select at least one of the plurality of moving plates 220 detected on the image acquired through the camera 110 based on the movement speed of the moving walkway 200. The processor 130 may extract the normal vectors only to at least one selected plate. Hereinafter, at least one selected plate will be referred to as a target plate.

Referring to FIG. 9, the processor 130 may select only the fifth and sixth moving plates 225 and 226 among the plurality of moving plates 220 (fifth to seventh moving plates 225 to 227) as the target plate, and extract only the normal vectors to the fifth and sixth moving plates 225 and 226. The reason is that, even if the normal vector of the seventh moving plate 227 is extracted to identify the tilt angle of the seventh moving plate 227 at time t1, the tilt angle of the moving plate 220 at location d3 (that is, the seventh moving plate at time t1) may be identified through the normal vector of the sixth moving plate 226 identified at time t2. Accordingly, the processor 130 may select the moving plate (i.e., a target plate) from which the normal vector 40 is extracted from among the plurality of moving plates 220 detected through the plurality of images 10, thereby preventing unnecessary waste of resources of the robot 100.

The target plate may be selected based on the movement speed of the moving walkway 200. That is, when the movement speed of the moving walkway 200 is slow, a small number of target plates may be selected, and when the movement speed of the moving walkway 200 is fast, a large number of target plates may be selected. As the movement speed of the moving walkway 200 increases, the tilt angle of the moving plate 220 on which the robot 100 stands may also change rapidly. Therefore, the reason why the processor 130 predicts the tilt angle of the moving plate 220 far from the robot 100 is that the robot 100 may take a more stable posture in the moving walkway 200.

In addition, the processor 130 may identify at least one of the plurality of plates based on the movement speed of the moving walkway 200 and the response speed of the suspension 122.

Specifically, the processor 130 may select the target plate based on the movement speed of the moving walkway 200 and the response speed of the suspension 122 among the plurality of moving plates 220 detected on the plurality of images 10 acquired through the camera 110. For example, referring to FIG. 9, when the response speed of the suspension 122 is slower than the movement speed of the moving walkway 200, the processor 130 may set the sixth movement plate 226 of the plurality of moving plates 220 (fifth to seventh moving plates 225 to 227) identified at time t1 as the target plate. Alternatively, when the response speed of the suspension 122 is faster than the movement speed of the moving walkway 200, the processor 130 may set all the plurality of moving plates 220 (fifth to seventh moving plates 225 to 227) identified at time t1 as the target plate.

In this way, the processor 130 may compare the identified movement speed of the moving walkway 200 and the response speed of the suspension 122 and flexibly set the target plate based on the comparison result. Accordingly, the processor 130 may appropriately change the posture of the robot according to the movement speed of the moving walkway 200.

In addition, when it is identified that the plurality of moving plates are not identified based on the plurality of images 10 acquired through the camera 110 while the robot 100 gets on the moving walkway 200, the processor 130 may control the suspension 122 of at least one wheel so that the robot 100 stands upright based on the sensing value acquired through the sensor of the robot 100. In this case, the sensor of the robot 100 may include an inertial measurement unit (IMU) sensor.

For example, when an object exists in front of the robot 100, the moving plate 220 may not be included in the image obtained through the camera 110. In this case, the processor 130 may not identify the tilt angle of the moving walkway 200. Therefore, the processor 130 may identify the tilt angle of the moving walkway 200 through the IMU sensor when the moving plate 220 of the moving walkway 200 is not detected on the plurality of images 10 acquired through the camera 110 while the robot 100 gets on the moving walkway 200 or the detected moving walkway 200 is less than the predetermined number.

The IMU sensor is a sensor composed of an accelerometer and a gyroscope, and may sense the posture of the robot and calculate the angle formed by the posture of the robot. In this case, the angle formed by the posture of the robot may correspond to the tilt angle of the moving walkway 200. Therefore, the processor 130 may identify an angle for the robot 100 to stand upright (or for the robot 100 to be level with the floor surface) based on the sensing information (i.e., the angle of the posture of the robot) acquired based on the IMU sensor. The processor 130 may control the robot 100 to stand upright by extending or compressing the suspension 122 connected to at least one wheel based on the identified angle.

When the robot 100 identifies that an object exists in front of the robot 100 or the distance between the object and the robot 100 is within a predetermined distance based on, for example, a Lidar sensor and/or a ToF sensor, the suspension 122 of at least one wheel may be controlled based on the sensing value acquired through the IMU sensor so that the robot 100 stands upright.

The processor 130 may identify the tilt angle of the moving walkway 200 based on the normal vectors of the plurality of moving plates 220 identified through the plurality of images 10, and use the IMU sensor even when the suspension 122 connected to at least one wheel is controlled based on the identified tilt angle of the moving walkway 200. Specifically, the processor 130 may control the suspension 122 connected to at least one wheel so that the robot 100 stands upright based on the normal vector of the moving plate 220 located in front of the robot 100, and then verify whether the robot 100 correctly stands upright based on the sensing value acquired through the IMU sensor. When it is identified that the robot 100 does not exactly stand upright based on the sensing value acquired through the IMU sensor, the processor 130 may identify a compensation value for the suspension 122 with the acquired sensing value. Based on the identified compensation value, the processor 130 may control the suspension 122 connected to at least one wheel again.

Hereinafter, based on FIGS. 10 and 11, a detailed method of aligning the posture of the robot 100 to get off the moving walkway 200 will be described.

When it is identified that the robot 100 is located within a predetermined distance from the getting off area 4 of the moving walkway 200, the processor 130 identifies the movement direction of the moving walkway 200 based on the acquired plurality of images 10, controls the driver 120 so that the robot 100 faces the getting off direction corresponding to the identified movement direction, and controls the driver 120 so that the upright robot 100 moves in the getting off direction and gets off the moving walkway 200.

Specifically, the processor 130 may first identify the getting off area 4 and identify the distance between the identified getting off area 4 and the robot 100.

The getting off area 4 refers to an area where a person or robot 100 getting on the moving walkway 200 lands after getting off the moving plate 220 of the moving walkway 200. For example, the getting off area 4 may include the fixed plate 210 installed at the exit of the moving walkway 200.

The getting off area 4 may further include the floor surface around the boarding gate of the moving walkway 200. For example, the getting on area 3 includes the fixed plate 210 installed at the boarding gate of the moving walkway 200, and may include a floor surface of a predetermined range around the fixed plate 210.

The processor 130 may identify the getting off area 4 based on the map data. Specifically, the getting off area 4 of each moving walkway 200 may be set on the map data in advance. Accordingly, the processor 130 may identify the location of the getting off area 4 based on the map data. The processor 130 may identify the real-time location of the robot 100 on the map data and identify the distance between the robot 100 and the getting off area 4 of the moving walkway 200 on which the robot 100 gets. When the distance between the position of the robot 100 on the map data and the location of the getting off area 4 of the moving walkway 200 on which the robot 100 gets is within the predetermined distance, the processor 130 may identify that the robot 100 is located within the predetermined distance from the getting off area 4 of the moving walkway 200.

In addition, the processor 130 may identify the fixed plate 210 on the image acquired through the camera 110 while the robot 100 is traveling, and identify the distance between the getting off area 4 and the robot 100 based on the identified fixed plate 210.

For example, on the image acquired through the camera 110 while the robot 100 gets on the moving walkway 200, only the moving plate 220 of the moving walkway 200 located in front of the robot 100 may be detected. However, as the robot 100 gradually approaches the getting off area 4 in the moving walkway 200, the fixed plate 210 located in the getting off area 4 may be detected on the image acquired through the camera 110. Therefore, when the fixed plate 210 is detected on the acquired image, the processor 130 may identify an area including the detected fixed plate 210 as the getting off area 4, and identify the distance between the identified getting off area 4 and the robot 100.

Figure 10:
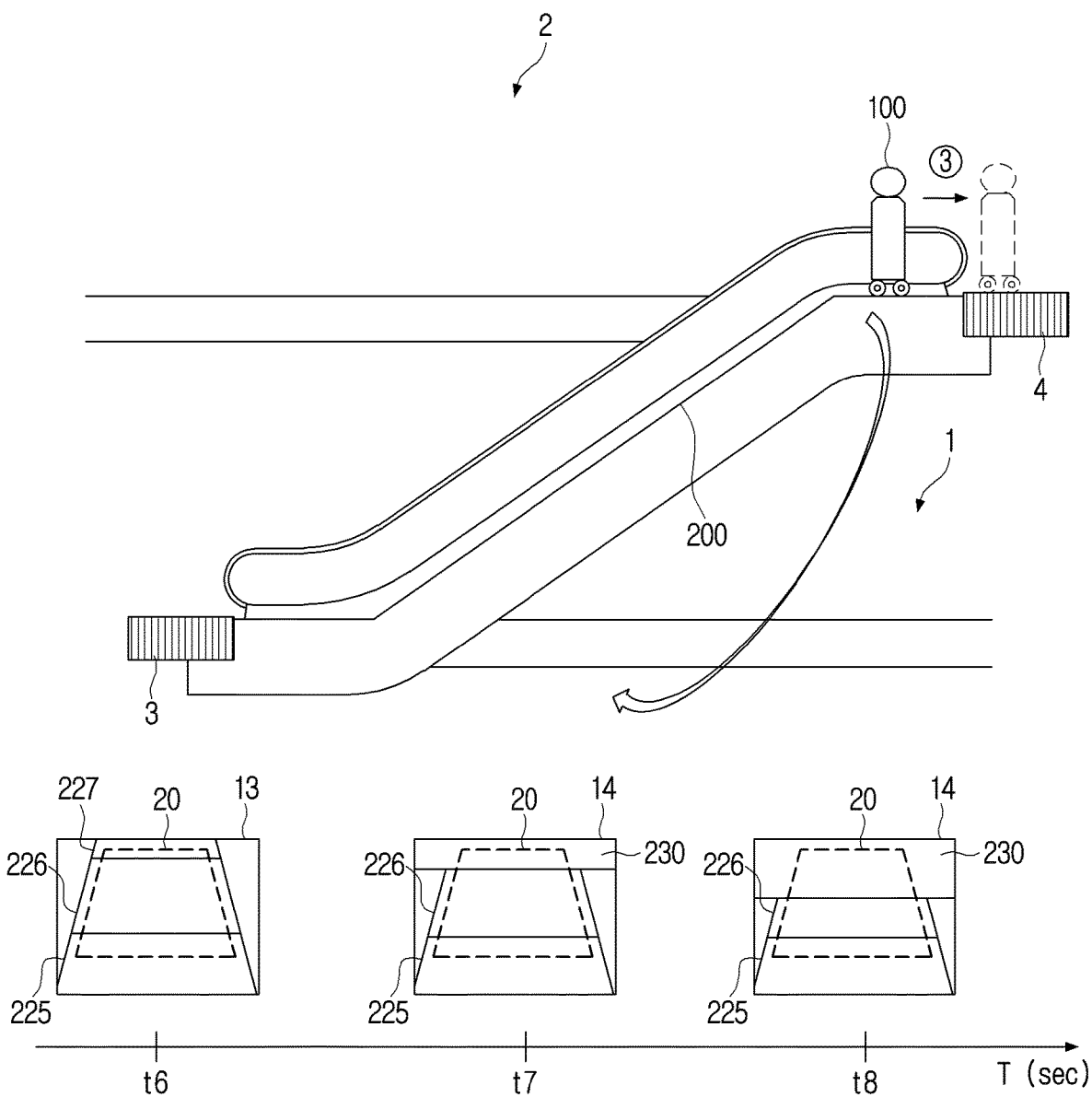
FIG. 10 is a diagram for describing identification of a getting off area and a distance between the getting off area and the robot based on an image acquired through a camera, according to one or more embodiments of the disclosure.

FIG. 10 is a diagram for describing identification of a getting off area and a distance between the getting off area and the robot based on an image acquired through a camera, according to one or more embodiments of the disclosure.

Specifically, referring to FIG. 10, the fixed plate 210 is not detected in an image 13 acquired at time t6, whereas the fixed plate 210 is detected in images 14 and 15 acquired at time t7 and t8. In this case, the processor 130 may identify the distance between the detected fixed plate 210 and the robot 100. The distance between the fixed plate 210 and the robot 100 may be identified based on the depth value of the fixed plate 210 included in the image acquired through the camera 110 (e.g., the depth camera 110 and/or the stereo camera 110) or the sensing value for the distance between the robot 100 and the fixed plate 210 acquired through the sensor. In addition, when the distance between the fixed plate 210 and the robot 100 is within the predetermined distance, the processor 130 may identify that the robot 100 is located within the predetermined distance from the getting off area 4.

Alternatively, as the robot 100 approaches the getting off area 4, the processor 130 may identify that the area of the fixed plate 210 of the moving walkway 200 on the image 10 acquired through the camera 110 gradually expands. Accordingly, as the robot 100 approaches the getting off area 4 of the moving walkway 200, the processor 130 may identify that the area of the fixed plate 210 gradually expands on the image acquired in real time through the camera 110.

As an example, referring back to FIG. 8, the area (or the portion of the fixed plate 210) of the fixed plate 210 detected in the image 15 acquired at time t8 is increased more than the area (or portion of the fixed plate 210) detected in the acquired image 14 at time t7. In this case, the processor 130 may identify the area whose location and size are changed within the plurality of images 10 acquired through the camera 110 as the getting off area 4. Accordingly, the processor 130 may identify that the robot 100 is located within the predetermined distance from the getting off area 4 when the area of the fixed plate 210 is greater than the predetermined range.

Alternatively, the processor 130 may identify the number of the plurality of moving plates 220 identified through the image 10 acquired while the robot 100 gets on the moving walkway 200, and may identify that the robot 100 is located within a predetermined distance from the getting off area 4 based on the number of identified moving plates 220. Specifically, when the number of identified moving plates 220 is changed or the number of identified moving plates 220 is less than the predetermined number, the processor 130 may identify that robot 100 is located within the predetermined distance from the getting off area 4.

Referring back to FIG. 8, the number of moving plates 220 detected in the image 13 acquired at time t6 is three, the number of moving plates 220 detected in the image 14 acquired at time t7 is two, and the number of moving plates 220 detected in the image 150 acquired at time t8 is one. In this case, when the predetermined number is two, the processor 130 may identify that the robot 100 is located within the predetermined distance from the getting off area 4 at time t8.

The robot 100 may identify the getting off area 4 on the image 10 through the neural network model trained to identify the getting off area 4. Specifically, by using the neural network model trained through the plurality of images (i.e., training data) that may be acquired in various getting on areas 4 including the image of the getting on area 4 of the moving walkway 200 in the travel space where the robot 100 is located, the processor 130 may identify the getting off area 4 of the moving walkway 200. The neural network model that detects the getting off area 4 included in the image may be implemented as, for example, a convolutional neural network (CNN) model, a fully convolutional networks (FCN) model, a regions with convolutional neuron networks features (RCNN) model and/or a YOLO model. The neural network model may be stored in the memory.

Alternatively, the processor 130 may identify that the robot 100 is within the predetermined distance from the getting off area 4 of the moving walkway 200 when the tilt angle of the identified moving walkway 200 is within the predetermined angle. In the case of the tilted moving walkway 200, the tilt angle may be the minimum in the getting off area 4 of the moving walkway 200. For example, in the getting off area 4 of the moving walkway 200, the tilt angle may be 0° so as to be parallel to the moving walkway 200 and the floor surface on which the moving walkway 200 is installed.

Accordingly, as the robot 100 approaches the getting off area 4 of the moving walkway 200, the tilt angle of the identified moving walkway 200 may also decrease. Therefore, the processor 130 may identify the tilt angle of the moving walkway 200 in real time based on the normal vector of the moving plate 220 located in front of the robot 100, and when the identified tilt angle is within the predetermined angle, the processor 130 may identify that the robot 100 is within the predetermined distance from the getting off area 4 of the moving walkway 200.

The processor 130 may identify that the robot 100 is located in the getting on area 3 by identifying the post beam installed on the fixing plate 210 of the getting on area 3. For example, when the post beam is recognized on the image acquired through the camera 110 while the robot 100 gets on the moving walkway 200, the processor 130 may identify that there is the getting off area 4 in front of the robot 100. To this end, the processor 130 may use the neural network model trained to recognize the post beam of the getting off area 4.

The neural network model may be a convolutional neural network (CNN) that includes a convolutional layer extracting feature information of an image and a fully-connected layer trained to identify an object included in the image based on the extracted feature information. The neural network model may be stored in memory. In addition, the processor 130 may perform communication with the post beam of the getting on area 4 through the communication interface of the robot 100 to identify the distance between the robot 100 and the post beam. In this case, when the identified distance is within a predetermined distance, the processor 130 may identify that the robot 100 is located in the getting on area 3.

In this way, the processor 130 may identify the getting off area 4 and identify the distance between the identified getting off area 4 and the robot 100 by various methods.

The processor 130 may identify the movement direction of the moving walkway 200 based on the acquired plurality of images 10 when it is identified that the robot 100 is within the predetermined distance from getting off area 4, and control the driver 120 so that the robot 100 faces the getting off direction corresponding to the identified movement direction. The processor 130 may control the driver 120 so that the robot 100 maintaining the upright state moves to the getting off direction and gets off the moving walkway 200.

Specifically, the processor 130 may set the ROI 20 including the moving plate 220 of the moving walkway 200 on the plurality of images 10 acquired through the camera 110, and identify the change in location of the moving plate 220 within the ROI 20. The movement direction of the moving walkway 200 in the getting off area 4 may be identified based on the identified change in location of the moving plate 220.

In this case, the processor 130 may identify the boundary line between the plurality of moving plates 220 using the straight line detection algorithm, extracts the normal vector 40 perpendicular to the identified boundary line, and identify the movement direction of the moving walkway 200 in the getting off area 4.

As a method of identifying, by the processor 130, the movement direction of the moving walkway 200 in the getting off area 4 based on the plurality of acquired images 10, the method of identifying the movement direction of the moving walkway 200 in the getting on area 3 may be equally applied. Therefore, a detailed description thereof will be omitted.

After identifying the movement direction of the moving walkway 200, the processor 130 may control the driver 120 so that the robot 100 faces the getting off direction corresponding to the identified movement direction. Specifically, the processor 130 may generate the control information based on the movement direction of the moving walkway 200 in the getting off area 4, and rotate the wheel 121 included in the driver 120 based on the generated control information to control the robot 100 so the robot 100 faces the getting on direction. That is, the processor 130 may control the driver 120 to align the robot 100 in the movement direction of the moving walkway 200.

The processor 130 may control the driver 120 so that the upright robot 100 moves to the getting off direction and gets off the moving walkway 200. Specifically, the processor 130 may identify whether the robot 100 is parallel to the floor surface. In this case, as the tilt angle of the moving walkway 200 decreases in the getting off area 4, the robot 100 within the predetermined distance from the getting off area 4 may be parallel to the floor surface.

The processor 130 may verify the posture of the robot through the IMU sensor. That is, it is identified based on the sensing value obtained through the IMU sensor whether the robot 100 is upright (or parallel to the floor surface), and when the robot 100 does not stand upright (or when it is identified that the robot is not parallel to the floor surface), it is possible to control the suspension 122 connected to at least one wheel based on the sensing value acquired through the IMU sensor. When it is identified that the robot 100 stands upright (or when it is identified that the robot 100 is parallel to the floor surface), the processor 130 may control the driver 120 so that the robot 100 moves to the identified getting off direction and gets off the moving walkway 200.

In this case, the movement speed of the robot 100 for getting off the moving walkway 200 may be set based on the movement speed of the moving walkway 200. That is, the processor 130 may set the getting off speed at a speed higher than the movement speed of the moving walkway 200 by a predetermined ratio. The processor 130 may control the driver 120 to move the robot 100 to the identified getting off direction at the set getting off speed.

To this end, the processor 130 may identify the movement speed of the moving walkway 200 in the getting off area 4. Specifically, the processor 130 sets the ROI 20 including the moving plate 220 of the moving walkway 200 on the plurality of images 10 acquired through the camera 110, and identify a movement speed of the moving walkway 200 based on the change in location of the moving plate 220 in the ROI 20 and the frame rate of the plurality of images 10.

In this case, the processor 130 may identify the boundary line between the plurality of movable plates 220 using the straight line detection algorithm, and track the identified boundary line to identify the change in location of the boundary line. As a method of identifying, by the processor 130, the movement speed of the moving walkway 200 in the getting off area 4 based on the plurality of acquired images 10, the method of identifying the movement speed of the moving walkway 200 in the getting on area 3 may be equally applied. Therefore, a detailed description thereof will be omitted.

The processor 130 may control the suspension 122 connected to at least one of the plurality of wheels 121 so that the robot 100 is inclined at an angle corresponding to the movement speed of the moving walkway 200 in the getting off area 4, and control the driver 120 so that the tilted robot 100 moves to the getting off direction and gets off the moving walkway 200. Specifically, the processor 130 may tension or compress the suspension 122 connected to at least one wheel so that the robot 100 tilts in the opposite direction to the getting off direction by considering the frictional force in the getting off area 4. For example, the processor 130 may tension the suspension (i.e., the first suspension 122-1 and the second suspension 122-2) connected to the wheel 121 (i.e., the first wheel 121-1 and the second wheel 121-2) located on the getting off direction side of the robot 100 to control the robot 100 so that the robot 100 is tilted in a direction opposite to the getting off direction.

In this regard, the method of identifying the angle at which the robot 100 is tilted based on the movement speed of the moving walkway 200 in the getting on area 3 and the method of controlling the suspension 122 connected to at least one wheel to control the robot 100 to be tilted may be equally applied, and therefore, a detailed description thereof will be omitted.

The processor 130 may identify the posture of the robot 100 as an upright posture or a tilted posture according to the driving mode of the robot 100 in the getting off area 4. For example, when the robot 100 stops in the getting off area 4 after getting off the moving walkway 200, the suspension 122 connected to at least one wheel may be controlled to tilt the posture of the robot at the angle corresponding to the movement speed of the moving walkway 200. However, when the robot 100 moves in the getting off area 4 after getting off the moving walkway 200, the suspension 122 connected to at least one wheel may be controlled so that the robot 100 stands upright.

When it is identified that an object exists in the getting off area 4, the processor 130 may control the driver 120 so that the robot 100 moves in the direction opposite to the getting off direction.

Specifically, the processor 130 may identify whether an object 410 exists in the getting off area 4 based on the image acquired through the camera 110. That is, when the getting off area 4 and the object 410 on the getting off area 4 are detected in the acquired image, the processor 130 may identify that the object 410 exists in the getting off area 4. Alternatively, the processor 130 may identify whether the object 410 exists in the getting off area 4 located in front of the robot 100 through the sensor (e.g., Lidar sensor and/or ToF sensor).

When the robot 100 identifies that the object 410 exists in the getting off area 4, the processor 130 identifies the distance between the object 410 present in the getting off area 4 and the robot 100. When it is identified that the identified distance is less than the predetermined distance, the processor 130 may control the plurality of wheels 121 of the driver 120 so that the robot 100 moves in the opposite direction to the identified getting off direction. Specifically, the processor 130 may control the plurality of wheels 1210 to rotate in the direction opposite to the movement direction of the moving walkway 200.

In this case, the processor 130 may control the driver 120 so that the robot 100 moves toward the opposite direction to the getting off direction at the same speed as the movement speed of the moving walkway 200 in the identified getting off area 4. Accordingly, the robot 100 may maintain its position on the moving walkway 200. This may exert the same effect as if a person walks in place in the moving walkway 200. When it is identified that the robot 100 does not exist in the getting off area 4 (e.g., when it is identified that the object existing in the getting off area 4 disappears), The processor 130 may control the driver 120 so that the robot 100 moves in the getting off direction and gets off the moving walkway 200.

Figure 11:
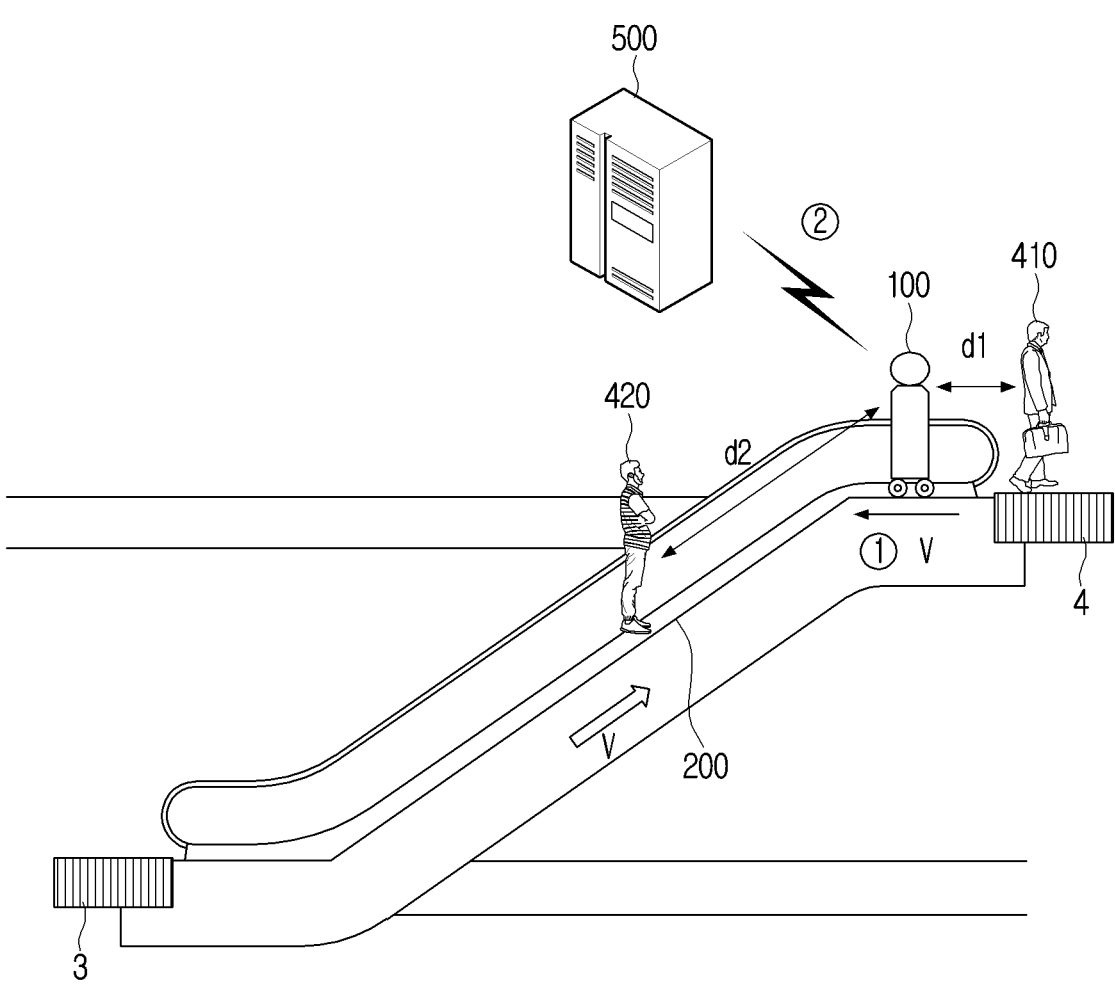
FIG. 11 is a diagram for explaining controlling a driver so that a robot moves in a direction opposite to a getting off direction when an object exists in the getting off area, according to one or more embodiments of the disclosure.

FIG. 11 is a diagram for explaining controlling the driver 120 so that the robot 100 moves in the direction opposite to the getting off direction when the object exists in the getting off area, according to one or more embodiments of the disclosure.

Referring to FIG. 11, the processor 130 may detect that a person 410 exists in the getting off area 4. In this case, the processor 130 may control the driver 120 so that the robot 100 moves in the direction opposite to the getting off direction at the same speed v as the movement speed v of the moving walkway 200 in the getting off area 4. In this way, the robot 100 may maintain its position on the moving walkway 200 until the person 410 existing in the getting off area 4 disappears. Accordingly, it is possible to avoid a collision with the person 410 existing in the getting off area 4 while staying on the moving walkway 200.

While the processor 130 controls the driver 120 by identifying that the object exists in the getting off area 4 to move the robot 100 to the opposite direction to the getting off direction, the processor 130 may identify whether another object 420 exists behind the robot 100.

Specifically, referring back to FIG. 11, the processor 130 may rotate the image acquired through the camera 110 provided at the rear of the robot 100 or the sensor provided at the rear or the sensor provided at the robot 100 to identify another object 420 located behind the robot 100. In this case, while the processor 130 controls the driver 120 so that the robot 100 moves in the direction opposite to the getting off direction, the processor 130 may identify the distance between another object 420 located behind the robot 100 and the robot 100.

When the distance between another object 420 located behind the robot 100 and the robot 100 is within the predetermined distance, the processor 130 may transmit a signal requesting to stop the moving walkway 200 to the server controlling the moving walkway 200 through the communication interface of the robot 100. Alternatively, the processor 130 may directly transmit a control signal to stop the operation of the moving walkway 200 to the moving walkway 200 through the communication interface.

Figure 12:
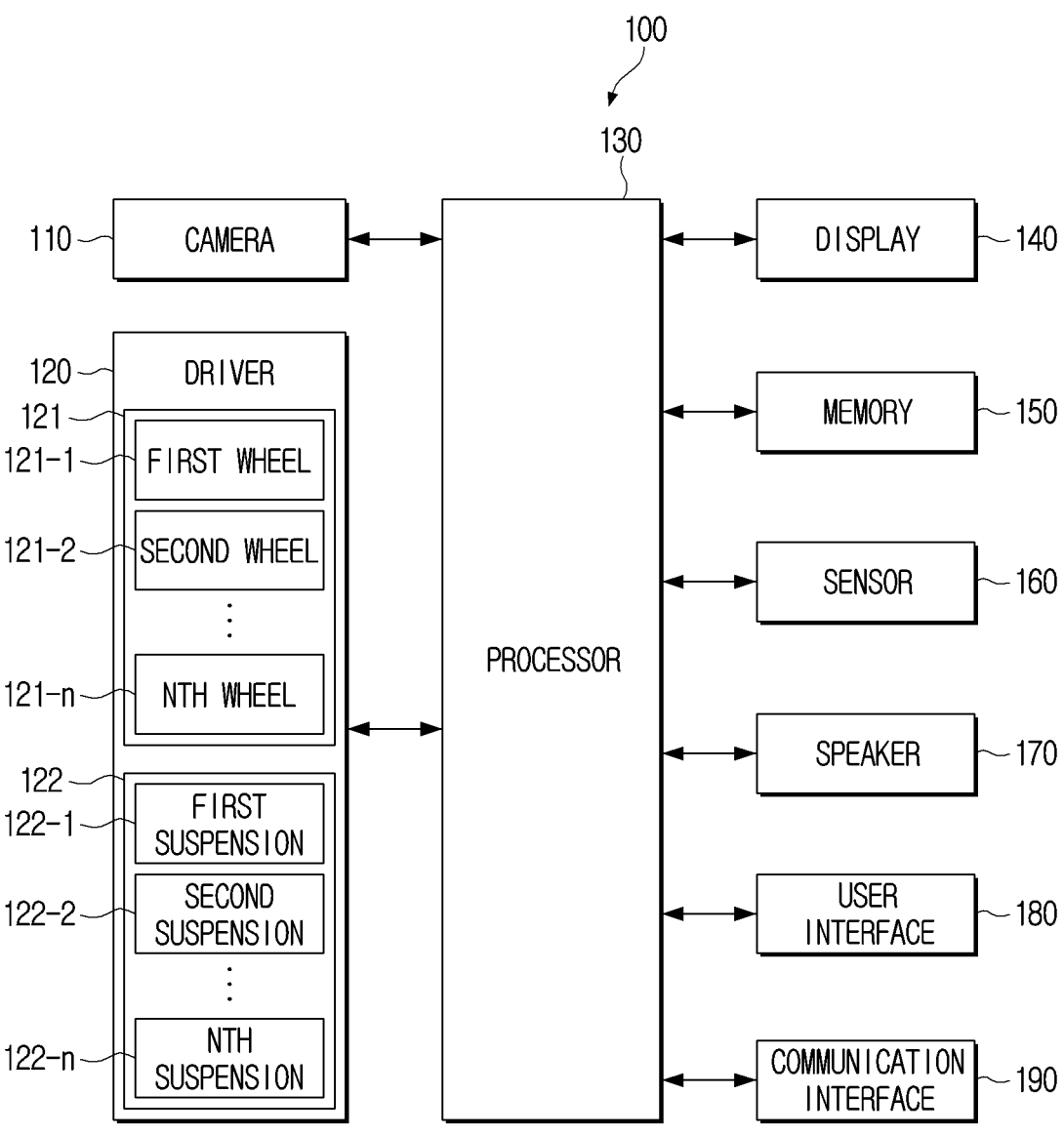
FIG. 12 is a detailed configuration diagram of a robot according to one or more embodiments of the disclosure.

FIG. 12 is a detailed configuration diagram of a robot according to one or more embodiments of the disclosure.

Referring to FIG. 12, the robot 100 includes the camera 110, the driver 120, the display 140, the sensor 150, the memory 160, the speaker 170, the user interface 180, and the communication interface 190. A detailed description for components overlapped with components illustrated in FIG. 2 among components illustrated in FIG. 12 will be omitted.

The display 140 may display various types of visual information. For example, the display 140 may display information on the map data, the traveling path of the robot 100, and/or the movement direction and movement speed of the escalator 200.

To this end, the display 140 may be implemented as a display including a self-light emitting element or a display including a non-light emitting element and a backlight. For example, the display 140 may be implemented as various types of displays such as a liquid crystal display (LCD), an organic light emitting diodes (OLED) display, light emitting diodes (LED), a micro LED, a Mini LED, a plasma display panel (PD), a quantum dot (QD) display, and quantum dot light-emitting diodes (QLED).

A driving circuit and/or a backlight unit, that may be implemented in a form such as a-si TFT, low temperature poly silicon (LTPS) TFT, and/or an organic TFT (OTFT), may be included in the display 140. The display 140 may be implemented as, for example, a touch screen coupled with a touch sensor, a flexible display, a rollable display, a 3D display, and/or a display to which a plurality of display modules are physically connected.

In addition, the display 140 may be implemented as a touch screen together with the touch panel.

Accordingly, the display unit 140 may function as an output unit for outputting the information between the robot 100 and the user, and at the same time, function as an input unit for providing an input interface between the robot 100 and the user.

The memory 150 may store data. For example, the map data about the travel space where the robot 100 is located may be stored in the memory 150.

The memory 150 may be implemented in a form of a memory embedded in the robot 100 or a form of a memory detachable from the robot 100, depending on a data storage purpose. For example, data for driving the robot 100 may be stored in the memory embedded in the robot 100, and data for an extension function of the robot 100 may be stored in the memory attachable to and detachable from the robot 100.

The memory embedded in the robot 100 may include at least one of, for example, a volatile memory (for example, a dynamic random access memory (DRAM), a static RAM (SRAM), and/or a synchronous dynamic RAM (SDRAM)), a non-volatile memory (for example, a one-time programmable read only memory (OTPROM), a programmable ROM (PROM), an erasable and programmable ROM (EPROM), an electrically erasable and programmable ROM (EEPROM), a mask ROM, and/or a flash ROM), a flash memory (for example, a NAND flash, and/or a NOR flash), a hard drive, and a solid state drive (SSD)).

In addition, the memory 300 detachable from the robot 100 may be implemented in the form of the memory card (e.g., compact flash (CF), secure digital (SD), micro secure digital (Micro-SD), mini secure digital (Mini-SD), extreme digital (xD), multi-media card (MMC)), and/or external memory (e.g., USB memory) connectable to a USB port.

According to an example, the memory 150 may store information on a plurality of neural networks (or, artificial intelligence) models. For example, the memory 150 may store a neural network model trained to identify the getting on area on the image acquired through the camera 110 and a neural network trained to identify the getting off area 4 on an image acquired through the camera 110.

Storing the information on the neural network model may mean storing various types of information related to the operation of the neural network model, for example, information on at least one layer included in the neural network model, information on parameters and/or bias used in each of the at least one layers. However, it goes without saying that the information on the neural network model may be stored in the internal memory of the processor 130 according to the implementation form of the processor 130. For example, when the processor 130 is implemented as dedicated hardware, the information on the neural network model may be stored in the internal memory of the processor 130.

The robot 100 includes at least one sensor 160. At least one sensor 160 may further include at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), a bio sensor, a temperature/humidity sensor, an illuminance sensor, and an ultra violet (UV) sensor in addition to sensors (e.g., Lidar sensor and/or ToF sensor) for detecting objects around the robot 100 and sensors (e.g., IMU sensor) for detecting a posture of a robot described above.

The speaker 170 may output a sound signal to the outside of the robot 100. The speaker 170 may output, for example, multimedia reproduction, recording reproduction, various kinds of notification sounds, and/or voice messages. The robot 100 may include an audio output device such as a speaker 170, or may include an output device such as an audio output terminal. In particular, the speaker 170 may provide, for example, acquired information, information processed/produced based on the acquired information, a response result to a user's voice, and/or an operation result in the form of voice. For example, the processor 130 may output a warning sound through the speaker 170 when it is identified that the robot 100 is located within the getting off area 4 of the moving walkway 200 and the predetermined distance and an object exists in the getting off area 4.

The user interface 180 is a component used for the robot 100 to interact with a user, and the processor 130 may receive various types of information, such as the control information of the robot 100, the travel space information (e.g., map data for the travel space) where the robot 100 is located, and the information on the moving walkway 200, through the user interface 180. The user interface 180 may include at least one of a touch sensor, a motion sensor, a button, a jog dial, a switch, or a microphone, but is not limited thereto.

The communication interface 190 may transmit and receive various types of content. For example, the communication interface 190 may receive or transmit signals from or to an external device (e.g., user terminal), an external storage medium (e.g., USB memory), and/or an external server (e.g., web hard), in a streaming or download method through communication methods such as AP-based Wi-Fi (wireless LAN network), Bluetooth, Zigbee, a wired/wireless local area network (LAN), a wide area network (WAN), Ethernet, IEEE 1394, a high-definition multimedia interface (HDMI), a universal serial bus (UBS), a mobile high-definition link (MHL), an audio engineering society/European broadcasting union (AES/EBU), optical, and coaxial.

The processor 130 may transmit a signal requesting to stop the driving of the moving walkway 200 to the control server 500 of the moving walkway 200 through the communication interface 190. Alternatively, the processor 130 may transmit a control signal for stopping driving of the moving walkway 200 to the moving walkway 200 through the communication interface 190.

Also, the processor 130 may communicate with the user terminal through the communication interface 190. In this case, the processor 130 may receive the location information of the user terminal communicating through the communication interface 190 and control the driver 120 so that the robot 100 tracks the user terminal.

Figure 13:
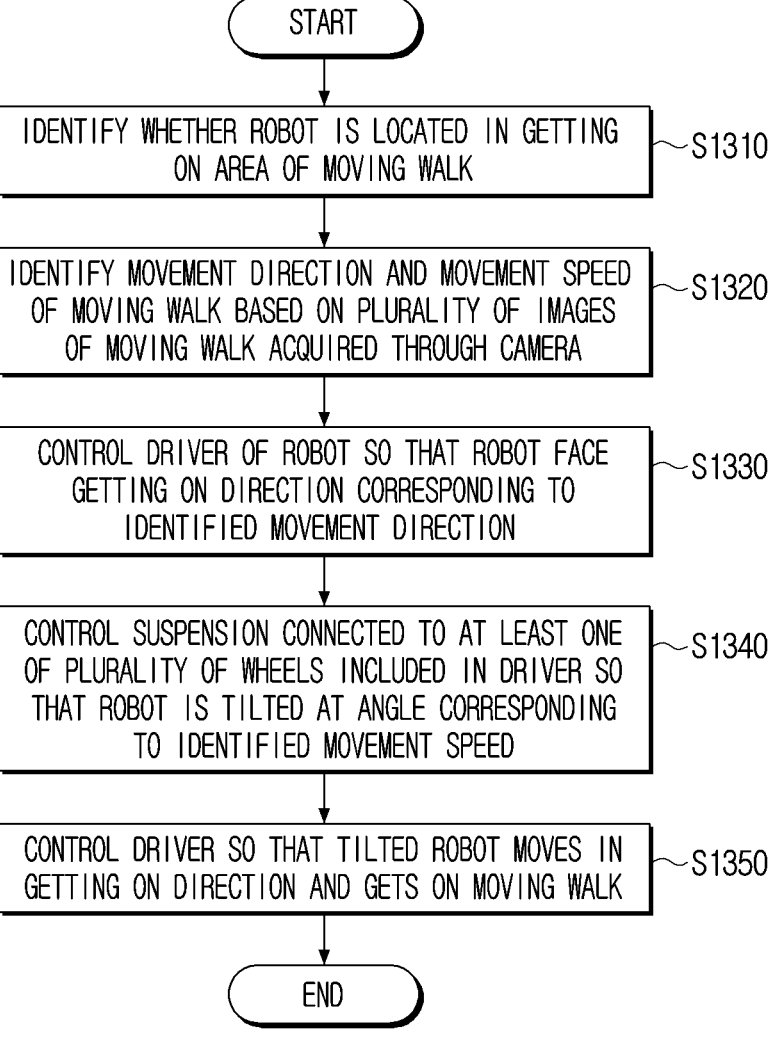
FIG. 13 is a flowchart schematically illustrating a method of controlling a robot getting on a moving walk according to one or more embodiments of the disclosure.

FIG. 13 is a flowchart schematically illustrating a method of controlling a robot getting on a moving walkway according to one or more embodiments of the disclosure.

In the method for controlling a robot 100, the processor 130 identifies whether the robot 100 is located in the getting on area 3 of the moving walkway 200 (S1310).

The processor 130 identifies the movement direction and movement speed of the moving walkway 200 based on the plurality of images 10 of the moving walkway 200 acquired through the camera 110 (S1320). In this case, the processor 130 may determine the boundary line between the plurality of plates of the moving walkway 200 based on the plurality of images 10 acquired through the camera 110 while the robot 100 is located in the getting on area 3, and identify the movement direction of the moving walkway 200 based on the normal vector of the identified boundary line. The processor 130 may identify the movement speed of the moving walkway 200 based on the movement speed of the identified boundary line.

The processor 130 identifies the movement direction and movement speed of the moving walkway 200, and then controls the driver 120 of the robot 100 so that the robot 100 faces the getting on direction corresponding to the identified movement direction (S1330).

The processor 130 controls the suspension 122 connected to at least one of the plurality of wheels 121 included in the driver 120 so that the robot 100 is tilted at an angle corresponding to the identified movement speed, and then controls the driver 120 so that the tilted robot 100 moves in the getting on direction and gets on the moving walkway 200 (S1350).

In this case, each of the plurality of wheels 121 is connected to the body of the robot 100 through the suspension 122.

FIG. 14 is a flowchart schematically illustrating a method of controlling a robot while the robot 100 gets on the moving walkway 200 according to one or more embodiments of the disclosure.

Steps S1410, S1420, S1430, S1440, and S1450 illustrated in FIG. 14 may correspond to steps S1310, S1320, S1330, S1340, and S1350 described in FIG. 13. Therefore, a detailed description thereof will be omitted.

Referring to FIG. 14, when it is identified that the robot 100 gets on the moving walkway 200, the processor 130 identifies the plurality of plates of the moving walkway 200 based on the plurality of images 10 of the moving walkway 200 acquired through the camera 110 (S1460).

The processor 130 identifies the tilt angle of the moving walkway 200 based on the normal vector of at least one plate among the identified plurality of plates (S1470). In this case, the processor 130 may identify at least one of the plurality of plates based on the movement speed of the moving walkway 200 and the response speed of the suspension 122. That is, the processor 130 may select a target plate for extracting the normal vector used to identify the tilt angle of the moving walkway 200 among the plurality of plates based on the movement speed of the moving walkway 200 and the response speed of the suspension 122.

After identifying the tilt angle of the moving walkway 200, the processor 130 controls the suspension 122 of at least one wheel so that the robot 100 stands upright based on the identified tilt angle (S1480). For example, the state in which the robot 100 stands upright may be the state in which the robot 100 is parallel to the floor surface where the moving walkway 200 is installed.

When it is identified that the plurality of plates are not identified based on the plurality of images 10 acquired through the camera 110 while the robot 100 gets on the moving walkway 200, the processor 130 may control the suspension 122 of at least one wheel so that the robot 100 stands upright based on the sensing value acquired through the sensor of the robot 100. In this case, the sensor of the robot 100 may include an inertial measurement unit (IMU) sensor. That is, the processor 130 may identify the posture of the robot based on the sensing value acquired through the IMU sensor, and control the suspension 122 of at least one wheel so that the identified posture of the robot stands upright.

FIG. 15 is a flowchart schematically illustrating a method of controlling a robot 100 getting off a moving walkway 200 according to one or more embodiments of the disclosure.

Steps S1505, S1510, S1515, S1520, S1525, S1530, S1535, and S1540 illustrated in FIG. 15 may correspond to steps S1410, S1420, S1430, S1440, 1450, S1460, S1470, and 1480 described in FIG. 14. Therefore, a detailed description thereof will be omitted.

When it is identified that the robot 100 is located within a predetermined distance from the getting off area 4 of the moving walkway 200, the processor 130 identifies the movement direction of the moving walkway 200 based on the acquired plurality of images 10 (S1545). In this case, when the tilt angle identified based on the normal vector of the plate is within a predetermined angle, the robot 100 is within a predetermined distance from the getting off area 4 of the moving walkway 200.

The processor 130 controls the driver 120 so that the robot 100 faces the getting off direction corresponding to the identified movement direction (S1550).

After controlling the driver 120 so that the robot 100 faces the identified movement direction, the processor 130 controls the driver 120 so that the upright robot 100 moves in the getting off direction and gets off the moving walkway 200 (S1555). That is, the processor 130 may control the driver 120 so that the robot 100, which is parallel to the floor surface on which the moving walkway 200 is installed, moves in the getting off direction and gets off the moving walkway 200.

In this case, when it is identified that an object exists in the getting off area 4, the processor 130 may control the driver 120 so that the robot 100 moves on the moving walkway 200 in the direction opposite to the getting off direction.

In the above description, steps S1310 to S1350, S1410 to S1480, and S1505 to S1555 may be further divided into additional steps or combined into fewer steps. Also, some steps may be omitted if necessary, and an order between the operations may be changed.

The above-described methods may be implemented in a form of application that can be installed in the existing robot. Alternatively, the above-described methods may be performed using a deep learning-based learned neural network (or deep learned neural network), that is, a learning network model. In addition, the above-described methods may be implemented only by software upgrade or hardware upgrade of the existing robot. In addition, various embodiments described above can be performed through an embedded server provided in the robot or a server outside the robot.

Various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the display apparatus (for example, the display apparatus A) according to the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. The term "non-transitory" means that the storage medium is tangible without including a signal, and does not distinguish whether data are semi-permanently or temporarily stored in the storage medium.

In addition, the above-described methods according to the diverse embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, Play-Store™). In case of the online distribution, at least a portion of the computer program product may be at least temporarily stored in a storage medium such as a memory of a server of a manufacturer, a server of an application store, or a relay server or be temporarily generated.

In addition, each of components (for example, modules or programs) according to various embodiments described above may include a single entity or a plurality of entities, and some of the corresponding sub-components described above may be omitted or other sub-components may be further included in the diverse embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

Although exemplary embodiments have been illustrated and described hereinabove, the embodiments are not limited to the abovementioned specific exemplary embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A robot, comprising:
a camera;
a driver comprising a plurality of wheels and a suspension for connecting each of the plurality of wheels to a body of the robot; and
a processor configured to:
based on the robot being identified as being located in an entrance area of the moving walkway, identify both a movement direction of a moving walkway and a movement speed of the moving walkway based on a plurality of images of the moving walkway received from the camera, control the driver so that the robot faces an entering direction corresponding to the identified movement direction;
control the suspension connected to at least one of the plurality of wheels so that the robot is tilted at an angle corresponding to the identified movement speed, and
control the driver so that the tilted robot moves in the entering direction and enters the moving walkway.

2. The robot as claimed in claim 1, wherein the processor is further configured to:
identify a boundary line between a plurality of plates of the moving walkway based on the plurality of images received from the camera while the robot is located in the entrance area,
identify the movement direction of the moving walkway based on a normal vector of the identified boundary line, and
identify the movement speed of the moving walkway based on a movement speed of the identified boundary line.

3. The robot as claimed in claim 1, wherein the processor is configured to:
based on the robot being identified as entering the moving walkway, identify a plurality of plates of the moving walkway based on the plurality of images of the moving walkway received from the camera,
identify a tilt angle of the moving walkway based on a normal vector of at least one of the identified plurality of plates, and
control the suspension connected to the at least one of the plurality of wheels so that the robot stands upright based on the identified tilt angle.

4. The robot as claimed in claim 3, wherein the processor is configured to identify the at least one of the plurality of plates based on the movement speed of the moving walkway and a response speed of the suspension.

5. The robot as claimed in claim 3,
wherein the robot further comprises a sensor, and
wherein the processor is further configured to control, based on the plurality of plates not being identified based on the plurality of images received from the camera while the robot enters the moving walkway, the suspension connected to the at least one of the plurality of wheels so that the robot stands upright based on a sensing value received from the sensor.

6. The robot as claimed in claim 3,
wherein, the processor is configured to:
based on the robot being identified as being located within a predetermined distance from an exit area of the moving walkway, re-identify the movement direction of the moving walkway based on the received plurality of images,
control the driver so that the robot faces an exiting direction corresponding to the re-identified movement direction, and
control the driver so that the upright robot moves in the exiting direction and exits the moving walkway.

7. The robot as claimed in claim 6, wherein, based on an object being identified as being located in the exit area, the processor controls the driver to move the robot in a direction opposite to the exiting direction.

8. The robot as claimed in claim 6, wherein the processor is configured to:
based on the identified tilt angle being identified as being within a predetermined angular range, identify that the robot is within the predetermined distance from the exit area of the moving walkway.

9. The robot as claimed in claim 1, wherein the processor is further configured to:

identify a width of the moving walkway based on the plurality of images received from the camera while the robot is located in the entrance area, determine an entrance location of the moving walkway of the robot based on the identified width of the moving walkway, and control the driver so that the robot faces the entering direction corresponding to the identified movement direction at the determined entrance location.

10. A method of controlling a robot, comprising:

based on the robot being identified as being located in an entrance area of the moving walkway identifying both a movement direction of a moving walkway and a movement speed of the moving walkway based on a plurality of images of the moving walkway received from a camera;

controlling a driver of the robot so that the robot faces an entering direction corresponding to the identified movement direction;

controlling a suspension of the driver, the suspension being connected to at least one of a plurality of wheels included in the driver, so that the robot is tilted at an angle corresponding to the identified movement speed; and controlling the driver so that the tilted robot moves in the entering direction and enters the moving walkway, wherein each of the plurality of wheels is connected to a body of the robot through the suspension.

11. The method as claimed in claim 10, wherein the identifying both the movement direction of the moving walkway and the movement speed of the moving walkway includes:

identifying a boundary line between a plurality of plates of the moving walkway based on the plurality of images received from the camera while the robot is located in the entrance area;

identifying the movement direction of the moving walkway based on a normal vector of the identified boundary line; and identifying the movement speed of the moving walkway based on a movement speed of the identified boundary line.

12. The method as claimed in claim 10, further comprising:

based on the robot being identified as entering the moving walkway, identifying a plurality of plates of the moving walkway based on the plurality of images of the moving walkway received from the camera;

identifying a tilt angle of the moving walkway based on a normal vector of at least one of the identified plurality of plates; and controlling the suspension connected to the at least one of the plurality of wheels so that the robot stands upright based on the identified tilt angle.

13. The method as claimed in claim 12, further comprising identifying the at least one of the plurality of plates based on the movement speed of the moving walkway and a response speed of the suspension.

14. The method as claimed in claim 12, further comprising, based on the plurality of plates not being identified based on the plurality of images received from the camera while the robot enters the moving walkway, controlling the suspension connected to the at least one of the plurality of wheels so that the robot stands upright based on a sensing value acquired through a sensor of the robot.

15. The method as claimed in claim 12, further comprising:

based on the robot being identified as being located within a predetermined distance from an exit area of the moving walkway, re-identifying the movement direction of the moving walkway based on the received plurality of images;

controlling the driver so that the robot faces an exiting direction corresponding to the re-identified movement direction; and controlling the driver so that the upright robot moves in the exiting direction and exits the moving walkway.

16. The method as claimed in claim 15, further comprising, after identifying that an object exists in the exit area, controlling the driver to move the robot in a direction opposite to the exiting direction.

17. The method as claimed in claim 15, further comprising, when the identified tilt angle is within a predetermined angular range, identifying that the robot is within the predetermined distance from the exit area of the moving walkway.

18. The method as claimed in claim 10, further comprising:

identifying a width of the moving walkway based on the plurality of images received from the camera while the robot is located in the entrance area, determining an entrance location of the moving walkway of the robot based on the identified width of the moving walkway, and controlling the driver so that the robot faces the entering direction corresponding to the identified movement direction at the determined entrance location.

19. A non-transitory computer readable recording medium comprising a program for executing a method of controlling a robot, the method including:

identifying both a movement direction of a moving walkway and a movement speed of the moving walkway based on a plurality of images of the moving walkway received from a camera after identifying that the robot is located in an entrance area of the moving walkway;

controlling a driver of the robot so that the robot faces an entering direction corresponding to the identified movement direction;

controlling a suspension of the driver, the suspension being connected to at least one of a plurality of wheels included in the driver, so that the robot is tilted at an angle corresponding to the identified movement speed; and controlling the driver so that the tilted robot moves in the entering direction and enters the moving walkway, wherein each of the plurality of wheels is connected to a body of the robot through the suspension.

20. The non-transitory computer readable medium as claimed in claim 19, wherein the method step of identifying both the movement direction of the moving walkway and the movement speed of the moving walkway includes:

identifying a boundary line between a plurality of plates of the moving walkway based on the plurality of images received from the camera while the robot is located in the entrance area;

identifying the movement direction of the moving walkway based on a normal vector of the identified boundary line; and identifying the movement speed of the moving walkway based on a movement speed of the identified boundary line.

* * * * *